US010009408B2

(12) United States Patent
Gondo et al.

(10) Patent No.: US 10,009,408 B2
(45) Date of Patent: Jun. 26, 2018

(54) APPARATUS FOR EFFICIENT RECONSTRUCTION OF DATA FILE

(71) Applicant: KABUSHIKI KAISHA TOSHIBA, Tokyo (JP)

(72) Inventors: Shunichi Gondo, Tokyo (JP); Hiroyuki Aizu, Kanagawa (JP); Hiroshi Kawazoe, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 333 days.

(21) Appl. No.: 14/643,143

(22) Filed: Mar. 10, 2015

(65) Prior Publication Data

US 2015/0264150 A1 Sep. 17, 2015

(30) Foreign Application Priority Data

Mar. 11, 2014 (JP) ................. 2014-047816

(51) Int. Cl.
*H04L 29/08* (2006.01)
(52) U.S. Cl.
CPC .................. *H04L 67/06* (2013.01)
(58) Field of Classification Search
CPC ....................................... H04L 67/06
USPC ......................................... 709/203
See application file for complete search history.

(56) References Cited

U.S. PATENT DOCUMENTS 6,460,087 B1 10/2002 Saito et al.
2009/0104871 A1* 4/2009 Cho .................. H04N 5/50
455/3.04
2010/0332754 A1* 12/2010 Lai .................. G06F 3/0625
711/118
2011/0274414 A1* 11/2011 Nemiroff ............... G11B 27/28
386/331
2013/0254631 A1* 9/2013 Luby .................. H03M 13/356
714/776
2016/0080450 A1* 3/2016 Kirkby ................. H04L 65/60
709/219

FOREIGN PATENT DOCUMENTS

JP 2005-352762 12/2005

OTHER PUBLICATIONS

Hacker, T.J. et al., "The End-to-End Performance Effects of Parallel TCP Sockets on a Lossy Wide-Area Network", pp. 434-443, IEEE IPDPS, (2002), 10 pages.

(Continued)

*Primary Examiner* — Nicholas Taylor
*Assistant Examiner* — Chong G Kim
(74) *Attorney, Agent, or Firm* — Nixon & Vanderhye, P.C.

(57) ABSTRACT

According to one embodiment, a communication apparatus communicates with a first device including a first data file via a network. The communication apparatus includes an indication unit and a request sending unit. The indication unit indicates a first data sending request to send first data from a first position as a start position of the first data file toward a second position as an end position of the first data file. Furthermore, the indication unit indicates a second data sending request to send second data from the second position toward the first position in the first data file. The request sending unit sends the first data sending request and the second data sending request to the first device.

7 Claims, 29 Drawing Sheets

(56) References Cited

OTHER PUBLICATIONS

Kawazoe, H. et al., "Design and Evaluation of Network-Adaptive Streaming Library for Screen Transfer System", IEICE Technical Report NS2012, pp. 25-30, vol. 112, No. 208, (Sep. 2012), 6 pages.
Techbrij, "Fast Downloading with Parallel Requests using asp.net Web API", Apicontroller, (Dec. 1, 2012), 6 pages.
Studying HTTP, "Range Requests and Partial Responses", RFC2612, Section 3.12, © 1999-2014.
English-language machine translation of JP2005-352762.

* cited by examiner

APPARATUS FOR EFFICIENT RECONSTRUCTION OF DATA FILE

CROSS-REFERENCE TO RELATED APPLICATION

This application is based upon and claims the benefit of priority from Japanese Patent Application No. 2014-047816, filed on Mar. 11, 2014; the entire contents of which are incorporated herein by reference.

FIELD

Embodiments described herein relate generally to a communication apparatus and a non-transitory computer readable medium.

BACKGROUND

As a protocol to send and receive data files between a client terminal and a server, HTTP (Hyper Text Transfer Protocol) is used. When the client terminal acquires a data file from the server, for example, by notifying the server of a request (Hereinafter, it is called "data sending request") by using GET method, the client terminal can desired data file. On the other hand, when the client terminal sends a data file to the server, for example, by notifying the server of a request (Hereinafter, it is called "data receiving request") by using PUT method or POST method, the client terminal can send data as the data file having a desired destination. In the data sending request or the data receiving request, the desired data file is indicated by URL (Uniform Resource Locator) or a part of URL.

Furthermore, in HTTP protocol, in order to send and receive a part (partial data) of data file between the client terminal and the server, partial data sending/receiving request can be performed. For example, when the client terminal desires to acquire partial data of the data file from the server, the client terminal notifies the server of a partial data sending request. For example, in the request by using GET method, the client terminal notifies by indicating a desired data file with URL and by indicating a range of the partial data in the data file.

As an application example of the partial data sending request, in order to simultaneously acquire a plurality of different data in the data file, a method for simultaneously performing a plurality of partial data sending requests is known. By simultaneously sending a plurality of partial data sending requests to the server, the client terminal parallely acquires each partial data. By using this method, a time to acquire all data of the data file can be shortened.

However, in the conventional method, for example, when respective data is acquired from one data file by two partial data sending requests, a time required to acquire the respective data is often different between two partial data sending requests. For example, when a large data file such as video data is acquired, after partial data is acquired by one partial data sending request, it often takes a long time to wait completion of acquisition of partial data by the other partial data sending request. This problem similarly occurs in case of simultaneously sending a plurality of partial data in the data file.

DETAILED DESCRIPTION

According to one embodiment, a communication apparatus communicates with a first device including a first data file via a network. The communication apparatus includes an indication unit and a request sending unit. The indication unit indicates a first data sending request to send first data from a first position as a start position of the first data file toward a second position as an end position of the first data file, and indicates a second data sending request to send second data from the second position toward the first position in the first data file. The request sending unit sends the first data sending request and the second data sending request to the first device.

Various embodiments will be described hereinafter with reference to the accompanying drawings.

The First Embodiment

Figure 1:
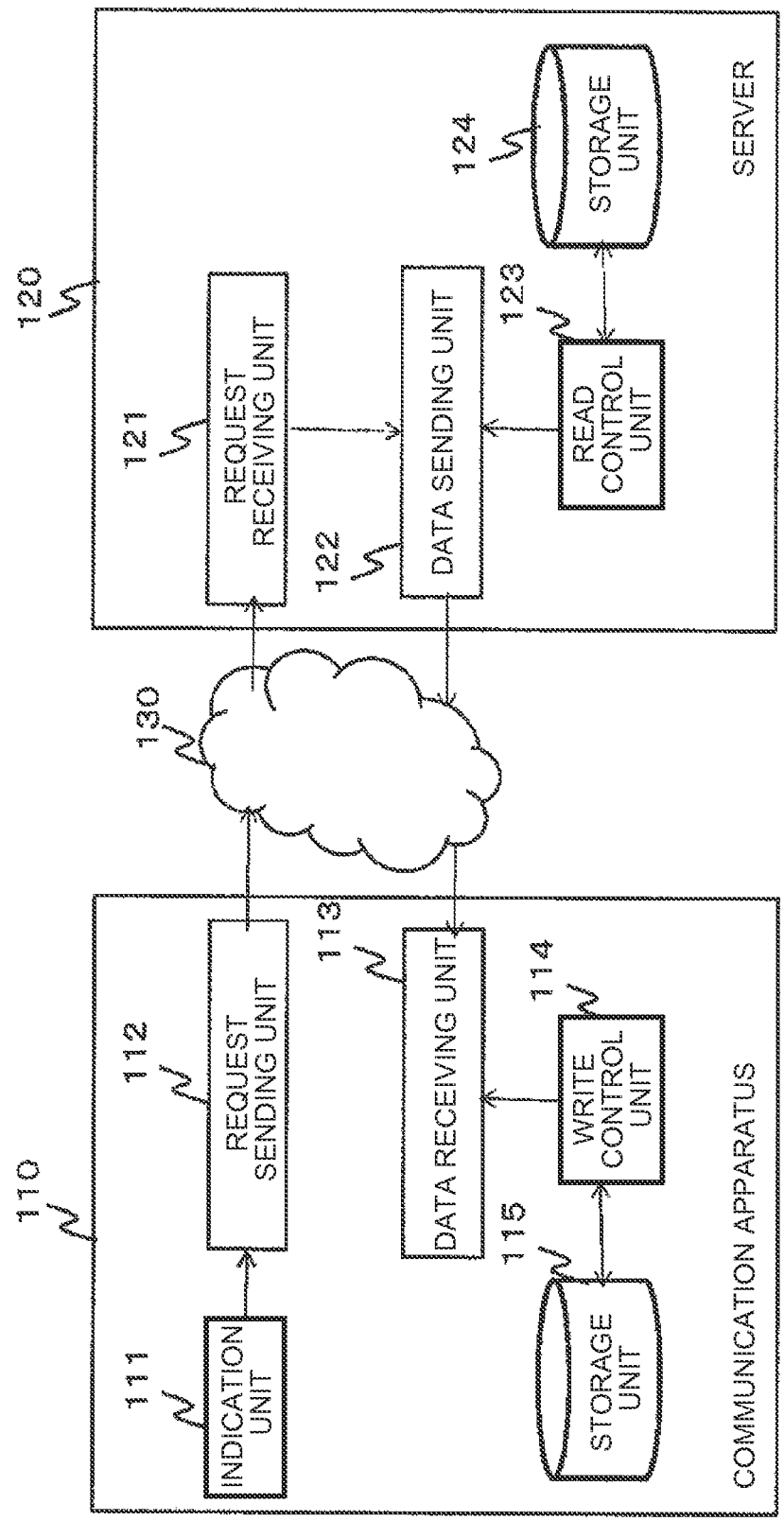
FIG. 1 is a block diagram of a system according to a first embodiment.

FIG. 1 is a block diagram of a system according to the first embodiment. The system of FIG. 1 is composed by a communication apparatus 110, a server 120, and a network 130. The communication apparatus 110 communicates with the server 120 via the network 130. The communication apparatus 110 and the server 120 mutually send/receive data by HTTP protocol.

The communication apparatus 110 is a device into which a data client program of HTTP protocol is installed. For example, the communication apparatus 110 is a PC, a home electric appliance, or a network camera. The communication apparatus 110 may be a data center.

The server 120 is a device into which a server program of HTTP protocol is installed. For example, the server 120 is a data center. The communication apparatus 110 may be a PC, a home electric appliance, or a network camera (In this case, the communication apparatus 110 is a data center).

The communication apparatus 110 includes an indication unit 111, a request sending unit 112, a data receiving unit 113, a write control unit 114, and a storage unit 115.

The indication unit 111 indicates a first data sending request which requests to send data from a first position (a start position in a first data file stored by the server) to a second position (an end position in the first data file). The indication unit 111 indicates a second data sending request which requests to send data from the second position (the end position in the first data file) to the first position (the end position).

The indication unit 111 indicates the first data sending request by GET request of HTTP (Hyper Text Transfer Protocol). In GET request, which data file to be acquired is indicated by URL. Furthermore, the indication unit 111 indicates the second data sending request by GET request of HTTP, and indicates which data file to be acquired by URL. Furthermore, as to the second data sending request, by extending a method for indicating acquisition range with Range header, the acquisition method is indicated. This method is explained by referring to FIG. 3B. The indication unit 111 indicates to acquire data from 999 bytes (end position of data file) to 0 byte (start position of data file) along reverse direction (from 999 bytes toward 0 byte) with Range header. This indication method is not imagined under standard specification of current HTTP protocol. In the standard specification of current HTTP protocol, the indication method with Range header indicates from a start position of data file toward an end position as bytes. On the other hand, in the first embodiment, by Range header, data of the data file is indicated to acquire along reverse direction as rbytes. Moreover, the method for indicating to acquire along reverse direction is not limited to this method. For example, another new word except for rbytes may be defined. New request command or option header may be defined to be identifiable. Furthermore, a method for describing numerals and signs of range may be changed without changing an indicated part as rbytes. For example, the indicated range may be indicated as "Range:bytes-999-0".

The request sending unit 112 sends the first data sending request and the second data sending request to the server 120. These sending requests may be sent at the same time or at different timings. For example, these sending requests are sent by GET request of HTTP (Hyper Text Transfer Protocol).

The data receiving unit 113 receives first data as a reply of the first data sending request from the server 120. The data receiving unit 113 receives second data as a reply of the second data sending request from the server 120.

When the data receiving unit 113 receives the first data and the second data, the write control unit 114 reconstructs a first data file by reversing and connecting the first data and the second data. As to reconstruction of the data file, the data receiving unit 114 may reverse and connect the first data and the second data during receiving or after receiving. When the data receiving unit 113 receives the first data from a first position (start position) to a third position and the second data from a second position (end position) to the third position, the write control unit 114 may make the data receiving unit 113 stop receiving the first data and the second data. For example, when a received range of the first data overlaps a received range of the second data, the write control unit 114 may make the data receiving unit 113 stop receiving. In an example of FIG. 3, at timing when the first data is received to 700 bytes and the second data is received to 700 bytes, the write control unit 114 may stop receiving the first data and the second data. Moreover, the second data need not be received to 700 bytes. When the second data is received to 701 bytes, the write control unit 114 may make the data receiving unit 113 stop receiving the first data and the second data. Namely, the write control unit 114 had better only acquire all the first data file from the first data and the second data, and need not acquire overlap data of the first data and the second data. Moreover, the write control unit 114 may detect acquisition of all the first data file when a total amount of the first data and the second data is equal to or larger than 999 bytes. Based on this timing, the write control unit 114 may make the data receiving unit 113 stop receiving.

The storage unit 115 stores the first data file. Here, the storage unit 115 may be a storage or a buffer such as a memory. Furthermore, the write control unit 114 may store the first data and the second data (as it is) into the storage unit 115 and reconstruct the first data file after storing into the storage unit 115.

The server 120 includes a request receiving unit 121, a data sending unit 122, a read control unit 123, and a storage unit 124.

When the request receiving unit 121 receives a sending request of data in the first data file from the communication apparatus 110, the request receiving unit 121 indicates the data sending unit 122 to send data of the sending request.

The data sending unit 122 reads data (indicated by the request receiving unit 121) from the storage unit 124 via the read control unit 123, and sends the data.

The read control unit 123 reads the first data file from the storage unit 124 according to an indication received by the request receiving unit 121.

The storage unit 124 stores the first data file. Here, the storage unit 124 may be a storage or a buffer such as a memory.

Figure 2:
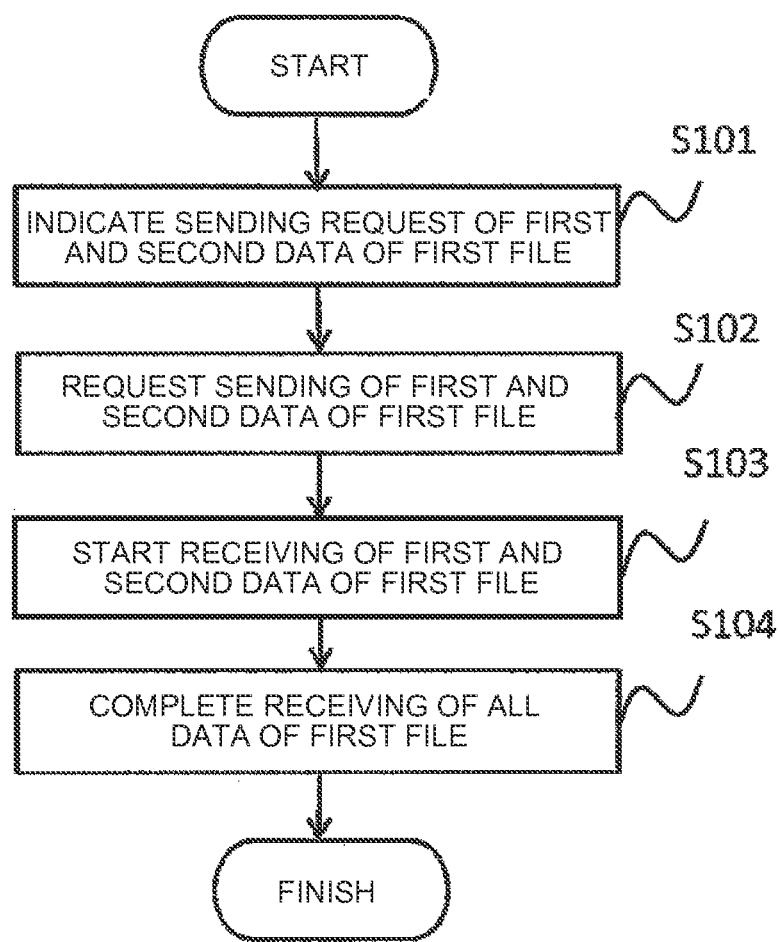
FIG. 2 is a flowchart of processing of a communication apparatus in FIG. 1.
Figure 3:
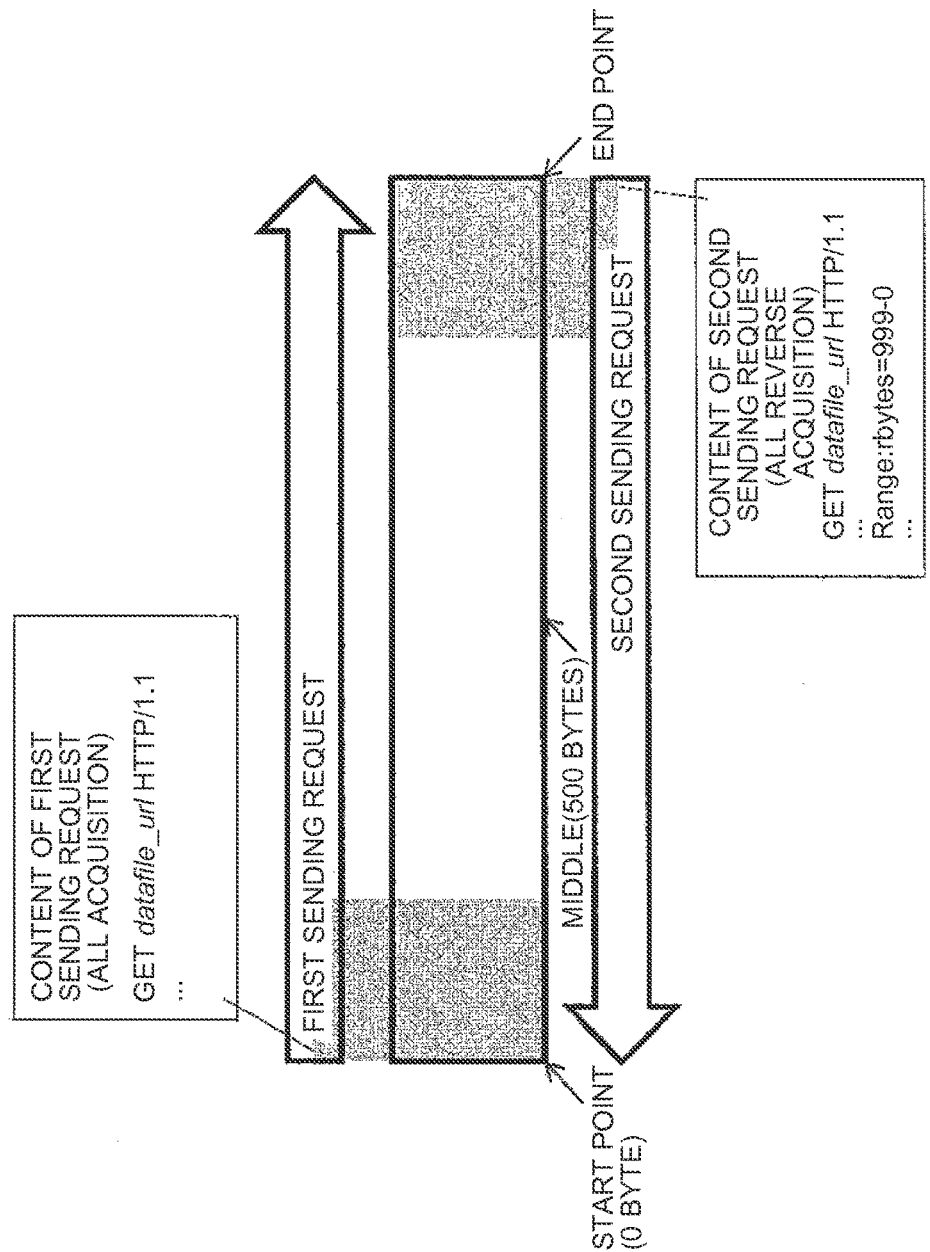
FIG. 3 is a schematic diagram of a first data sending request and a second data sending request of a first data file.

Next, by referring to FIGS. 2 and 3, concrete example of operation of the communication apparatus 110 will be explained. FIG. 2 is a flow chart of processing of the communication apparatus 110. FIG. 3 is a schematic diagram showing a method for acquiring the first data and the second data of the first data file.

First, the indication unit 111 indicates a first data sending request and a second data sending request (S101). As the first data sending request, a data file specified with datafile_url in FIG. 3 is indicated by HTTP GET request. Furthermore, as the second data sending request, a data file specified with datafile_url in FIG. 3 is indicated by HTTP GET request. Furthermore, a request to send data from an end position of the data file to a start position thereof is indicated by Range header. Specifically, by Range header, the data file from 999 bytes (an end position of the data file) to 0 byte (a start position of the data file) is indicated to be acquired along reverse direction. In an example of FIG. 3, the data file is indicated by representation "Range:rbyetes=999-0".

Next, the request sending unit 112 sends the first data sending request and the second data sending request indicated by the indication unit 111 (S102).

When receiving the first data sending request, the server 120 sends the indicated data file from the start position (0 byte) to the end position (999 bytes). Furthermore, when receiving the second data sending request, the server 120 sends the indicated data file from the end position (999 bytes) to the start position (0 byte).

In the communication apparatus 110, the data receiving unit 113 receives the first data and the second data in order (S113).

The write control unit 114 detects that the data receiving unit 113 receives data of the first data sending request and data of the second data sending request to overlap position. After that, the write control unit 114 makes the data receiving unit 113 stop receiving the first data and the second data. For example, at timing when data of the first data sending request is received to 700 bytes and data of the second data sending request is received to 700 bytes, the write control unit 114 makes the data receiving unit 113 stop receiving data. Here, the second data need not be received to 700 bytes. When the second data is received to 701 bytes, the write control unit 114 may make the data receiving unit 113 stop receiving the first data and the second data. Namely, the write control unit 114 had better only acquire all the first data file from the first data and the second data, and need not acquire overlap data of the first data and the second data.

When the data receiving unit 113 receives respective data of the first data sending request and the second data sending request, the write control unit 114 connects the respective data and reconstructs a first data file. The write control unit 114 stores the reconstructed first data file into the storage unit 115.

In the first embodiment, when receiving of all the first data file is detected, the write control unit 114 stops receiving data. However, the write control unit may not stop receiving. Furthermore, when receiving of all the first data file is detected, the write control unit 114 makes the server 120 stop sending data.

Furthermore, in the first embodiment, two data sending requests are sent for all the first data file. However, two data sending requests may not be sent for all the first data file. Two data sending requests may be sent for a part of the first data file. For example, by dividing the first data file into N data pieces, a first data sending request from a start position to an end position and a second data sending request from the end position to the start position may be sent for each of N data pieces. In this case, data sending requests of 2N are sent.

The communication apparatus 110 can be realized by using a general purpose computer device as a basic hardware. Namely, the indication unit 111, the request sending unit 112, the data receiving unit 113, the write control unit 114, and the storage unit 115 can be realized by a processor (loaded onto the computer device) executing a program. Here, the communication apparatus 110 may be realized by previously installing the program into the computer device. Furthermore, by storing the program into a memory medium such as CD-ROM or by distributing the program via a network, the communication apparatus 110 may be realized by suitably installing the program into the computer device. Furthermore, the storage unit 115 can be realized by suitably utilizing a memory (or a hard disk) internal or external to the computer device, or a memory medium such as CD-R, CD-RW, DVD-RAM or DVD-R.

According to the communication apparatus 110 of the first embodiment, the server 120 is required to send data from a start position of the data file to an end position thereof, and to send data from the end position to the start position. As a result, in case of receiving a plurality of data in parallel, data in the data file can be effectively acquired. Even if a speed to receive data of the first data sending request is different from a speed to receive data of the second data sending request, a received data range of the first data sending request and a received data range of the second data sending request are forwarded along mutual reverse direction in the data file. The respective data ranges are overlapped at some timing. Accordingly, data of the data file can be effectively acquired.

Modification 1 of the First Embodiment

Next, a modification 1 of the first embodiment will be explained. Here, system component of modification 1 of the first embodiment is same as FIG. 1. The modification 1 is not shown in Figure but a sign of each unit of modification 1 is A added to a sign of each unit in FIG. 1.

In a communication apparatus 110A of the modification 1 of the first embodiment, after sending a first data sending request from a start position of the data file to an end position thereof and a second data sending request from the end position to the start position, another data sending request is additionally sent, which is different from the communication apparatus 110 of the first embodiment.

In the communication apparatus 110A, respective functions of an indication unit 111A, a request sending unit 112A, a data receiving unit 113A, and a write control unit 114A, are different from those of the communication apparatus 110 of the first embodiment.

In addition to a function of the indication unit 111 of the first embodiment, the indication unit 111A further indicates a third data sending request to send data from a third position (between a first position (start position) and a second position (end position) of the first data file) to the second position (end position). Furthermore, the indication unit 111A further indicates a fourth data sending request to send data from the third position to the first position (start position) of the first data file. As a method for indicating the third position, a plurality of methods can be applied. As a first example, the third position is indicated as a middle position between the first position (start position of data file) and the second position (end position of data file) (Refer to FIG. 4). As a second example, the third position is indicated based on a speed to receive the first data and a speed to receive the second data by the data receiving unit 113a (refer to FIG. 5).

In addition to a function of the request sending unit 112 of the first embodiment, the request sending unit 112A has a function to send the third data sending request and the fourth data sending request. Timing to send the third data sending request and the fourth data sending request are, for example, a first timing between after the data receiving unit 113A starts to receive first data and second data and before receiving of the first data and the second data is completed. Timing is not limited to the first timing. The third data sending request and the fourth data sending request may be sent at the same timing or at different timings.

The data receiving unit 113 receives first data~fourth data as respective replies of the first data sending request~the fourth data sending request.

At timing when the data receiving unit 113A receives the first data from a first position (start position of data file) to a fourth position and the fourth data from the third position to the fourth position, the write control unit 114A may make the data receiving unit 113A stop receiving the first data and the fourth data. At timing when the data receiving unit 113A receives the second data from a second position (end position of data file) to a fifth position and the third data from the third position to the fifth position, the write control unit 114A may make the data receiving unit 113A stop receiving the second data and the third data. Furthermore, if a speed for the data receiving unit 113A to receive the first data (or the second data) after starting to receive the third data is slower than that before starting to receive the third data, the write control unit 114A may make the data receiving unit 113A stop receiving the third data. Furthermore, if a speed for the data receiving unit 113A to receive the first data (or the second data) is slower than that before starting to receive the fourth data, the write control unit 114A may make the data receiving unit 113A stop receiving the fourth data.

Next, concrete example of operation of the communication apparatus 110A will be explained. Two examples will be explained. By referring to FIG. 4, a first example will be explained. By referring to FIG. 5, a second example will be explained.

Figure 4:
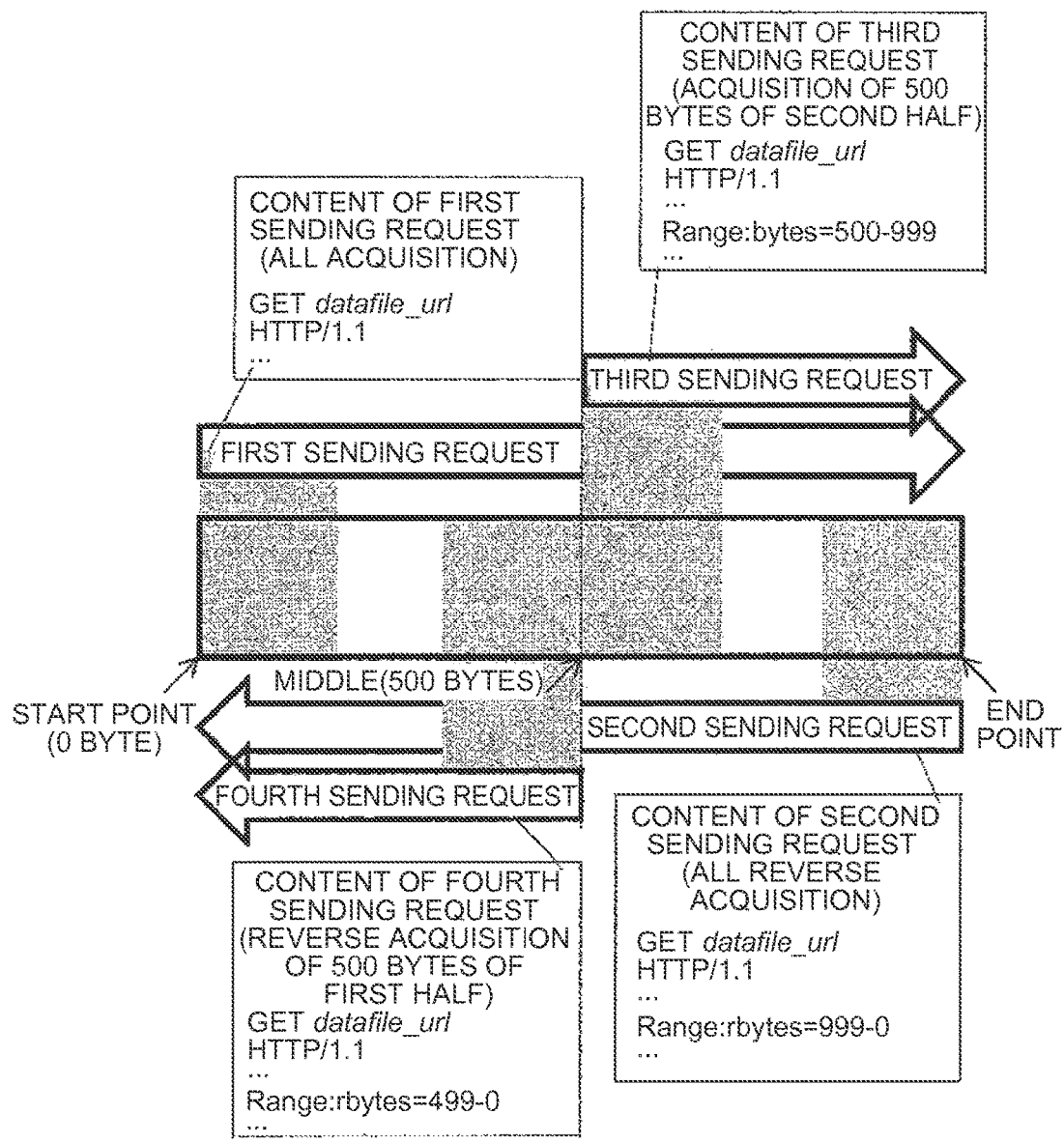
FIG. 4 is a first example of sending requests according to a first modification of the first embodiment.

FIG. 4 shows the first example of a method for acquiring first data~fourth data of the first data file.

First, the indication unit 111A indicates a first data sending request and a second data sending request. As the first data sending request, a data file specified with datafile_url in FIG. 4 is indicated by HTTP GET request. Specifically, as a data file, datafile_url is indicated. Furthermore, as the second data sending request, a data file specified with datafile_url in FIG. 4 is indicated by HTTP GET request. Furthermore, a request to send data from an end position of the data file to a start position thereof is indicated by Range header.

Next, the request sending unit 112A sends the first data sending request and the second data sending request indicated by the indication unit 111A.

When receiving the first data sending request, the server 120A sends the indicated data file "datafile_url" from the start position (0 byte) to the end position (999 bytes). Furthermore, when receiving the second data sending request, the server 120A sends the indicated data file "datafile_url" from the end position (999 bytes) to the start position (0 byte).

In the communication apparatus 110A, the data receiving unit 113A receives the first data and the second data in order.

Next, the indication unit 111A indicates a third data sending request and a fourth data sending request. As the third data sending request, a data file specified with datafile_url in FIG. 4 is indicated by HTTP GET request, and a data range is specified by Range header. Specifically, as the data file, datafile_url is indicated, and the data range from 500 bytes to 999 bytes are indicated. Furthermore, as the fourth data sending request, a data file specified with datafile_url in FIG. 4 is indicated by HTTP GET request, and a data range is specified by Range header. Specifically, the data range from 499 bytes to 0 byte (start position of the data file) is indicated to be acquired along reverse direction by Range header. In the example of FIG. 4, the data range is indicated as representation "Range:rbytes=499-0".

Next, the request sending unit 112A sends the third data sending request and the fourth data sending request indicated by the indication unit 111A.

In the communication apparatus 110A, the data receiving unit 113 receives the third data and the fourth data in order.

By detecting that the data receiving unit 113A receives data of the first data sending request and data of the fourth data sending request to overlap position along mutual reverse direction in the data file, the write control unit 114A may make the data receiving unit 113A stop receiving the first data and the fourth data. Furthermore, by detecting that the data receiving unit 113A receives data of the second data sending request and data of the third data sending request to overlap position along mutual reverse direction in the data file, the write control unit 114A may make the data receiving unit 113A stop receiving the second data and the third data.

Figure 5:
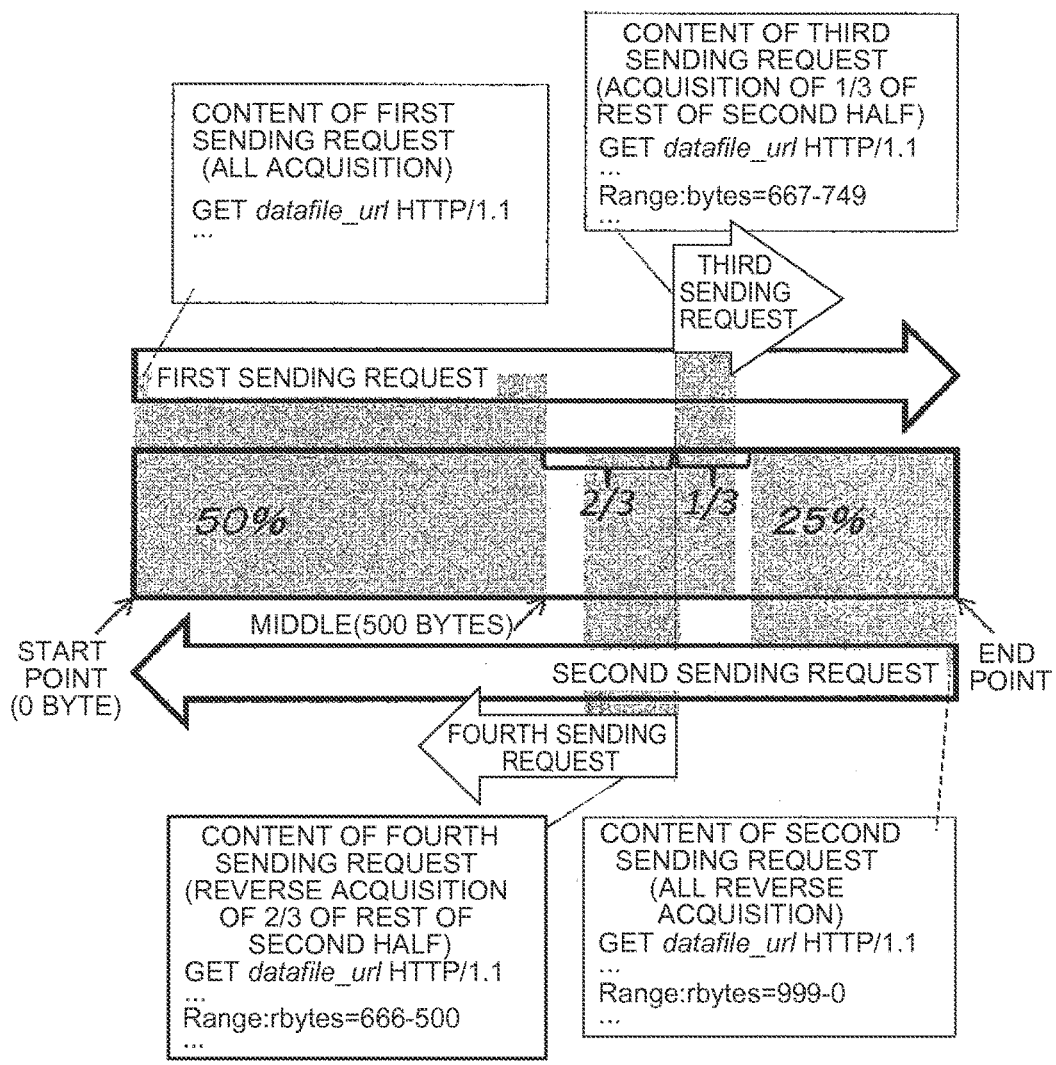
FIG. 5 is a second example of sending requests according to a second modification of the first embodiment.

FIG. 5 shows the second example of a method for acquiring first data~fourth data of the first data file.

As to the method for indicating the first data sending request and the second data sending request, a function of the indication unit 111A is same as the first example. Accordingly, its explanation is omitted. A method for indicating the third data sending request and the fourth data sending request will be explained.

As the third data sending request, the indication unit 111A indicates a data file specified with datafile_url in FIG. 5 by HTTP GET request, and indicates a data range by Range header. Specifically, as the data file, datafile_url is indicated, and the data range from 667 bytes to 749 bytes are indicated. Furthermore, as the fourth data sending request, the indication unit 111A indicates a data file specified with datafile_url in FIG. 5 by HTTP GET request, and indicates a data range by Range header. Specifically, the data range from 666 bytes to 500 bytes is indicated to be acquired along reverse direction by Range header. In the example of FIG. 5, the data range is indicated as representation "Range:rbytes=666-500". Based on a speed (measured by the data receiving unit 113A) to receive the first data as a reply of the first data sending request and a speed to receive the second data as a reply of the second data sending request, the indication unit 111A indicates respective data ranges of the third data sending request and the fourth data sending request. In this example, a ratio of the first data receiving speed to the second data receiving speed is 2:1. Accordingly, the respective data ranges are indicated to match with the ratio.

Next, the request sending unit 112A sends the third data sending request and the fourth data sending request.

In the communication apparatus 110A, the data receiving unit 113A receives the third data and the fourth data in order. By detecting that the data receiving unit 113A receives data of the first data sending request and data of the fourth data sending request to overlap position along mutual reverse direction in the data file, the write control unit 114A may make the data receiving unit 113A stop receiving the first data and the fourth data. Furthermore, by detecting that the data receiving unit 113A receives data of the second data sending request and data of the third data sending request to overlap position along mutual reverse direction in the data file, the write control unit 114A may make the data receiving unit 113A stop receiving the second data and the third data.

According to the communication apparatus 110A of the modification 1 of the first embodiment, the server 120 is required to send data from a start position of the data file to an end position thereof, and to send data from the end position of the data file to the start position thereof. As a result, in case of receiving a plurality of data in parallel, data in the data file can be effectively acquired, and the same effect as the communication apparatus 110 of the first embodiment can be accomplished. Furthermore, according to the communication apparatus 110A of the modification 1 of the first embodiment, after sending the data sending request, additional data sending request of the data file is sent. Accordingly, data in the data file can be further effectively acquired.

Furthermore, in the communication apparatus 110A of the modification 1 of the first embodiment, even if receiving of data of the third data sending request or the fourth data sending request is interrupted, data not received as a reply of the third data sending request or the fourth data sending request can be received as a reply of the first data sending request or the fourth data sending request. As a result, it is not necessary to send a new data sending request to acquire the data not received.

Modification 2 of the First Embodiment

Figure 6:
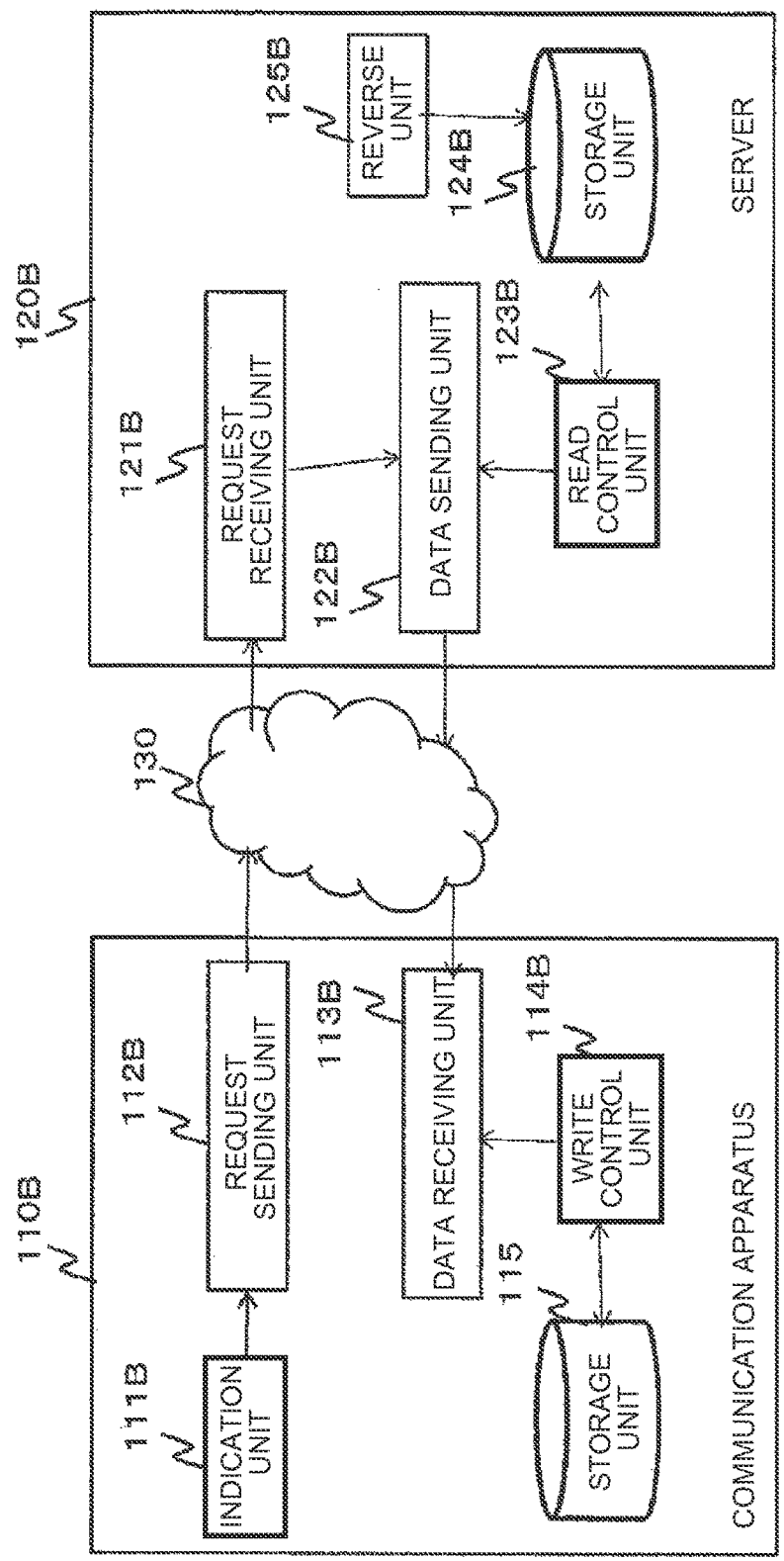
FIG. 6 is a block diagram of a system according to the second modification of the first embodiment.

FIG. 6 is a block diagram of a system of the modification 2 of the first embodiment.

Figure 7:
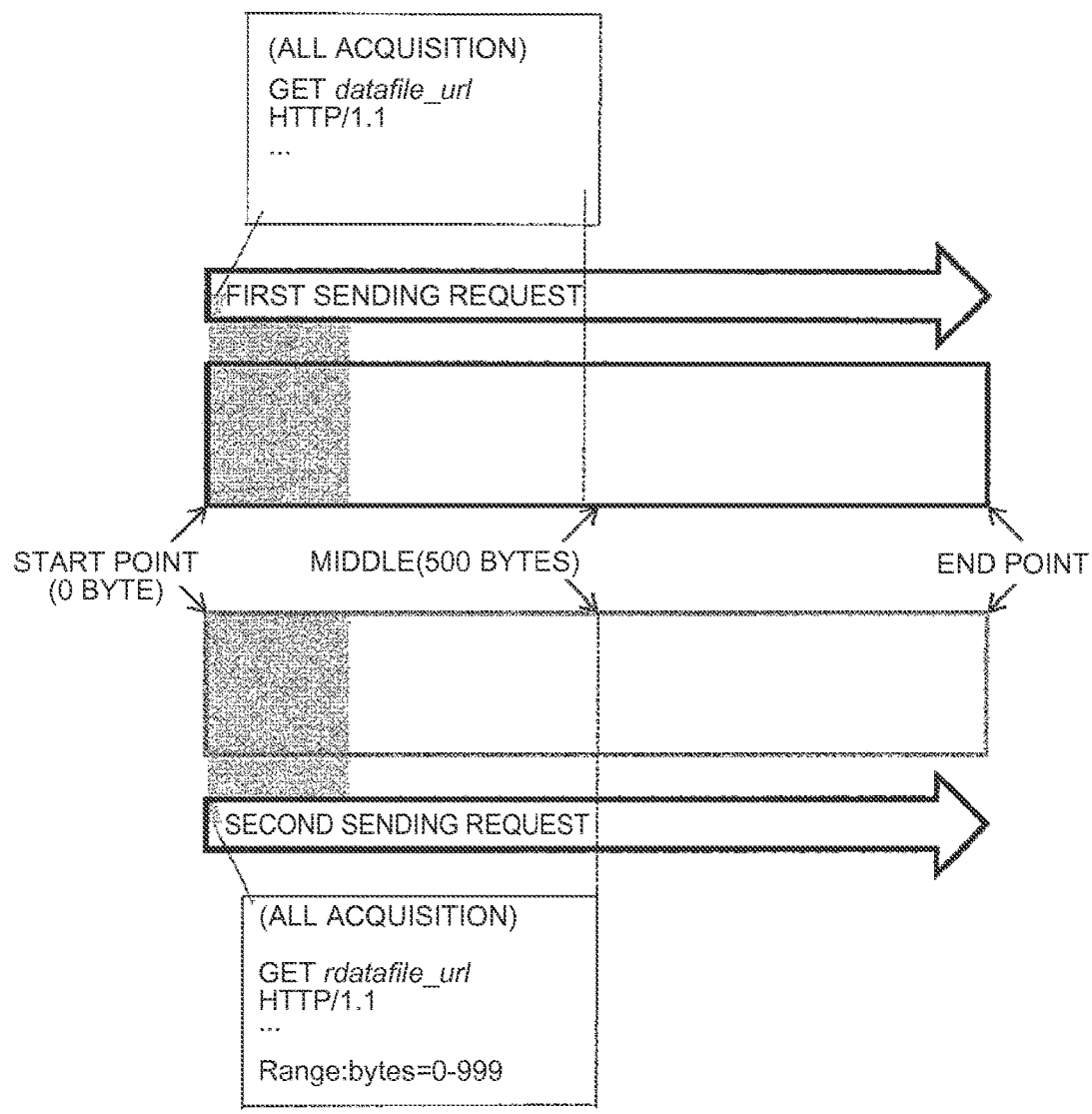
FIG. 7 is a schematic diagram of sending requests according to the second modification of the first embodiment.

In the system of the modification 2 of the first embodiment, a server 120A preserves a first data file and a second data file which is the reversed first data file (Refer to FIG. 7). The communication apparatus 110B requests (first data sending request) to send data from a start position of a first data file to an end position thereof, and requests (second data sending request) to send data from a start position of a second data file to an end position thereof, to the server 120B. The second data file is a reversed data file of the first data file. The start position of the second data file corresponds to the end position of the first data file, and the end position of the first data file corresponds to the start position of the second data file. Accordingly, in the modification 2 of the first embodiment, data is received from the start position of the first data file toward the end position, and data is received from the end position of the first data file toward the start position, which is common to the first embodiment. In the modification 2 of the first embodiment, by normally sending HTTP GET request from the communication apparatus 110B, the same effect as the communication apparatus 110 of the first embodiment can be realized. This specific feature is different from the communication apparatus 110 of the first embodiment. Namely, in the modification 2 of the first embodiment, instead of the data sending request to acquire data along reverse direction from an end position to a start position of the first data file, a data sending request to acquire data along forward direction from a start position to an end position of the second data file (reversed first data file) can be performed.

In the communication apparatus 110B, respective functions of an indication unit 111B, a request sending unit 112B, a data receiving unit 113B and a write control unit 114B, are different from those of the indication unit 111, the request sending unit 112, the data receiving unit 113 and the write control unit 114 of the communication apparatus 110 of the first embodiment.

In the server 120B, respective functions of a request receiving unit 121B, a data sending unit 122B and a storage unit 124B, are different from those of the request receiving unit 121, the data sending unit 122 and the storage unit 124 of the server 120 of the first embodiment. Furthermore, the server 120B includes a reverse unit 125B, which is different from the server 120.

The indication unit 111B indicates a first data sending request to send data from a first start position to a first end position of the first data file stored in the server 120B. The indication unit 111B indicates a second data sending request to send data from a second start position to a second end position of the second data file (reversed from the first data file) stored in the server 120B. For example, the second start position of the second data file corresponds to the first end position of the first data file, and the second end position of the second data file corresponds to the first start position of the first data file. For example, the indication unit 111B indicates the first data sending request by GET request of HTTP (Hyper Text Transfer Protocol). In GET request, which data file to be acquired is indicated by URL. In the example of FIG. 7, URL is indicated as datafile_url. Furthermore, the indication unit 111B indicates the second data sending request by GET request of HTTP, and indicates which data file to be acquired by URL. In the example of FIG. 7, URL is indicated as rdatafile_url. Here, data file of rdatafile_url is a reversed data file of datafile_url. In this way, in the modification 2 of the first embodiment, two GET requests of HTTP can be indicated as respective data sending requests along forward direction.

The request sending unit 112B sends the first data sending request and the second data sending request to the server 120B. The request sending unit 112B may send the first data sending request and the second data sending request at the same time or at different timings. For example, the request sending unit 112B sends GET request of HTTP (Hyper Text Transfer Protocol).

The data receiving unit 113B receives first data as a reply of the first data sending request, and receives second data as a reply of the second data sending request.

At timing when the data receiving unit 113B receives the first data file from the first start position to the first end position and the second data file from the second start position to the second end position (corresponding to the first start position of the first data file), the write control unit 114B may make the data receiving unit 113B stop receiving the first data and the second data. After receiving the first data and the second data, the write control unit 114B reconstructs the first data file by using the first data and the second data. As to the second data of the second data file reversed with a predetermined method by the server 120B, the write control unit 114B reconstructs the first data file in order by reversing the second data with the predetermined method, and utilizes as partial data of the first data file. Accordingly, by combining the first data acquired by the first data sending request (to send data of the first data file) and the second data acquired by the second data sending request (to send data of the second data file), the write control unit 114B can reconstruct the first data file. Here, after the data receiving unit 113B completes receiving of the first data and the second data, the write control unit 114B may reverse the second data and connect them. Alternatively, during receiving, the write control unit 114B may reverse and connect.

The server 120B includes a request receiving unit 121B, a data sending unit 122B, a read control unit 123B, a storage unit 124B and a reverse unit 125B.

Among data in the first data file, the request receiving unit 121B receives a first data sending request of first data from a first start position to a first end position. Among data in the second data file, the request receiving unit 121B receives a second data sending request of second data from a second start position to a second end position.

The storage unit 124B stores the first data file and the second data file as the reversed first data file.

The reverse unit 125B generates the second data file by reversing the first data file, and stores into the storage unit 124B. Here, the reverse unit 125B may previously store the second data file, or may dynamically (internally, virtually) reverse the first data file in response to a request from the communication apparatus 110B.

The data sending unit 122B sends the first data of the first data file according to the first data sending request, and sends the second data of the second data file according to the second data sending request.

Next, by referring to FIG. 7, concrete example of operation of the communication apparatus 110B will be explained. FIG. 7 is a schematic diagram showing a method for acquiring first data of the first data file and second data of the second data file.

First, the indication unit 111B indicates a first data sending request and a second data sending request. As the first data sending request, a data file specified with datafile_url in FIG. 7 is indicated by HTTP GET request. Specifically, as the data file, datafile_url is indicated. Furthermore, as the second data sending request, a data file specified with rdatafile_url in FIG. 7 is indicated by HTTP GET request. Specifically, as the data file, rdatafile_url is indicated.

Next, the request sending unit 112B sends the first data sending request and the second data sending request indicated by the indication unit 111B. The first data sending request and the second data sending request may be sent at the same time or at different timings.

When receiving the first data sending request, the server 120B sends the indicated data file "datafile_url" from the start position (0 byte) toward the end position (999 bytes). Furthermore, when receiving the second data sending request, the server 120B sends the indicated data file "rdatafile_url" from the end position (0 byte) toward the start position (999 bytes).

In the communication apparatus 110B, the data receiving unit 113B receives the first data and the second data in order.

At timing when the data receiving unit 113B receives the first data file from the first start position to the first end position, and receives the second data file from the second start position to the second end position (corresponding to the first start position of the first data file), the write control unit 114B makes the data receiving unit 113B stop receiving the first data and the second data.

After receiving the first data and the second data, the write control unit 114B reconstructs the first data file by using the first data and the second data.

In the modification 2, the first data file and the second data file are different data files. However, data corresponding to the second data file reversed from the first data file may be stored into the same data file as the first data file. In this case, as for each of the first data sending request and the second data sending request, the indication unit 111B may indicate the first data file as URL, and indicate a data range stored in the first data file by using Range header. Furthermore, as a unit to be reversed in the first data file to generate the second data file, a plurality of method can be applied. For example, a method for reversing byte/bit unit, a method for reversing a unit having arbitrary size, a method for reversing a structural unit (For example, access unit of video data) having some meaning, and a method for reversing a slice unit, can be applied. Here, by enlarging a unit to be reversed, reconstruction processing by the communication apparatus 110B is accelerated, i.e., handling easiness is often improved.

For example, if the data file has size of 1000 bytes, the data file originally storing from start 1 byte to last 1000 bytes can be reversed to a data file storing from last 1000 bytes to start 1 byte in order.

Furthermore, if data of the data file is structured with a data field, the data field of the data can be reversed as a unit. For example, if a size of the data field is fixed as 188 bytes (such as MPEG2-TS data file), the data file is reversed by a unit of 188 bytes or a unit of multiple of 188 bytes. For example, in case of 30 frames per second of each frame in video frame data, the video frame data from 1st frame to 30-th frame may be reversed along direction from 30-th frame to 1st frame, or the video frame data may be reversed per second.

Furthermore, as to a unit (to reverse the first data file), a reverse method, URL of the data file (reversed from the first data file) and data range in the data file, the server 120B had better notify the communication apparatus 110B of this information previously. For example, by storing meta data into a data file or a data base by the server 120B, when the communication apparatus 120B reconstructs the first data file, the communication apparatus 120B may refer the meta data from the server 120B. Furthermore, the communication apparatus 110B (receiving side) may previously know by any method (For example, this information is previously included in the program).

Furthermore, in the modification 2, by detecting that all data to reconstruct the first file is received, the write control unit 114B stops receiving data. However, receiving of data may not be stopped. The write control unit 114B may not stop receiving but makes the server 120 stop sending data.

Furthermore, in the modification 2, two files are prepared by reversing the first file. However, two data may be prepared by reversing partial data of the first file. In this case, a data sending request may be sent for each of two data. For example, by dividing the first file into N data pieces, and by preparing reverse data of each of N data pieces, the data sending request may be sent for each of N data pieces. In this case, data sending requests of 2N are sent.

The communication apparatus 110B can be realized by using a general purpose computer device as a basic hardware. Namely, the indication unit 111B, the request sending unit 112B, the data receiving unit 113B, the write control unit 114B, and the storage unit 115B can be realized by a processor (loaded onto the computer device) executing a program. Here, the communication apparatus 110B may be realized by previously installing the program into the computer device. Furthermore, by storing the program into a memory medium such as CD-ROM or by distributing the program via a network, the communication apparatus 110B may be realized by suitably installing the program into the computer device. Furthermore, the storage unit 115B can be realized by suitably utilizing a memory (or a hard disk) internal or external to the computer device, or a memory medium such as CD-R, CD-RW, DVD-RAM or DVD-R.

Furthermore, the server 120B can be realized by using a general purpose computer device as a basic hardware. Namely, the request unit 121B, the data sending unit 122B, the read control unit 123B, the storage unit 124B, and the reverse unit 125B can be realized by a processor (loaded onto the computer device) executing a program. Here, the server 120B may be realized by previously installing the program into the computer device. Furthermore, by storing the program into a memory medium such as CD-ROM or by distributing the program via a network, the server 120B may be realized by suitably installing the program into the computer device. Furthermore, the storage unit 124B can be realized by suitably utilizing a memory (or a hard disk) internal or external to the computer device, or a memory medium such as CD-R, CD-RW, DVD-RAM or DVD-R.

In the system of modification 2 of the first embodiment, the server 120B generates the second data file by reversing the first data file, and stores the second data file. The communication apparatus 110B requests (first data sending request) the server 120B to send data from a start position of the first data file to an end position thereof, and requests (second data sending request) the server 120B to send data from a start position of the second data file to an end position thereof. This means that, the communication apparatus 110B receives data from the start position of the first data file to the end position thereof, and receives data from the end position of the first data file to the start position thereof. Namely, in the modification 2 of the first embodiment, by normally sending HTTP GET request, the communication apparatus 110B can realize the same effect as the communication apparatus 110 of the first embodiment.

Modification 3 of the First Embodiment

Next, a modification 3 of the first embodiment will be explained. A system of the modification 3 of the first embodiment is same as that of FIG. 6.

In a communication apparatus 110C of the modification 3 of the first embodiment, after sending a first data sending request to send data from a start position of the first data file to an end position thereof and a second data sending request to send data from a start position of the second data file (reversed first data file) to an end position thereof to a server 120B, a data sending request is additionally sent, which is different from the communication apparatus 110B of the modification 2 of the first embodiment.

In the communication apparatus 110C, respective functions of an indication unit 111C, a request sending unit 112C, and a data receiving unit 113C, are different from those of the communication apparatus 110B of the modification 2 of the first embodiment.

In addition to a function of the indication unit 111B of the modification 2 of the first embodiment, the indication unit 111C further indicates a third data sending request to send data from a third position (between a start position (first start position) and an end position (first end position) of the first data file) to the first end position. Furthermore, the indication unit 111C indicates a fourth data sending request to send data from a fourth position (between a start position (second start position) and an end position (second end position) of the second data file) to the second end position. As a method for indicating the third position and the fourth position, a plurality of methods can be applied. As a first example, the third position is indicated as a middle position between the first start position and the first end position, and the fourth position is indicated as a middle position between the second start position and the second end position (Refer to FIG. 8). As a second example, the third position and the fourth position are indicated based on a speed to receive the first data and a speed to receive the second data by the data receiving unit 113C.

In addition to a function of the request sending unit 112B of the modification 2 of the first embodiment, the request sending unit 112C has a function to send the third data sending request and the fourth data sending request. Timing to send the third data sending request and the fourth data sending request are, for example, a first timing between after the data receiving unit 113C starts to receive first data and second data and before receiving of the first data and the second data is completed. Timing is not limited to the first timing. The third data sending request and the fourth data sending request may be sent at the same timing or at different timings.

The data receiving unit 113C receives first data~fourth data as respective replies of the first data sending request~the fourth data sending request.

Next, concrete example of operation of the communication apparatus 110C will be explained.

Figure 8:
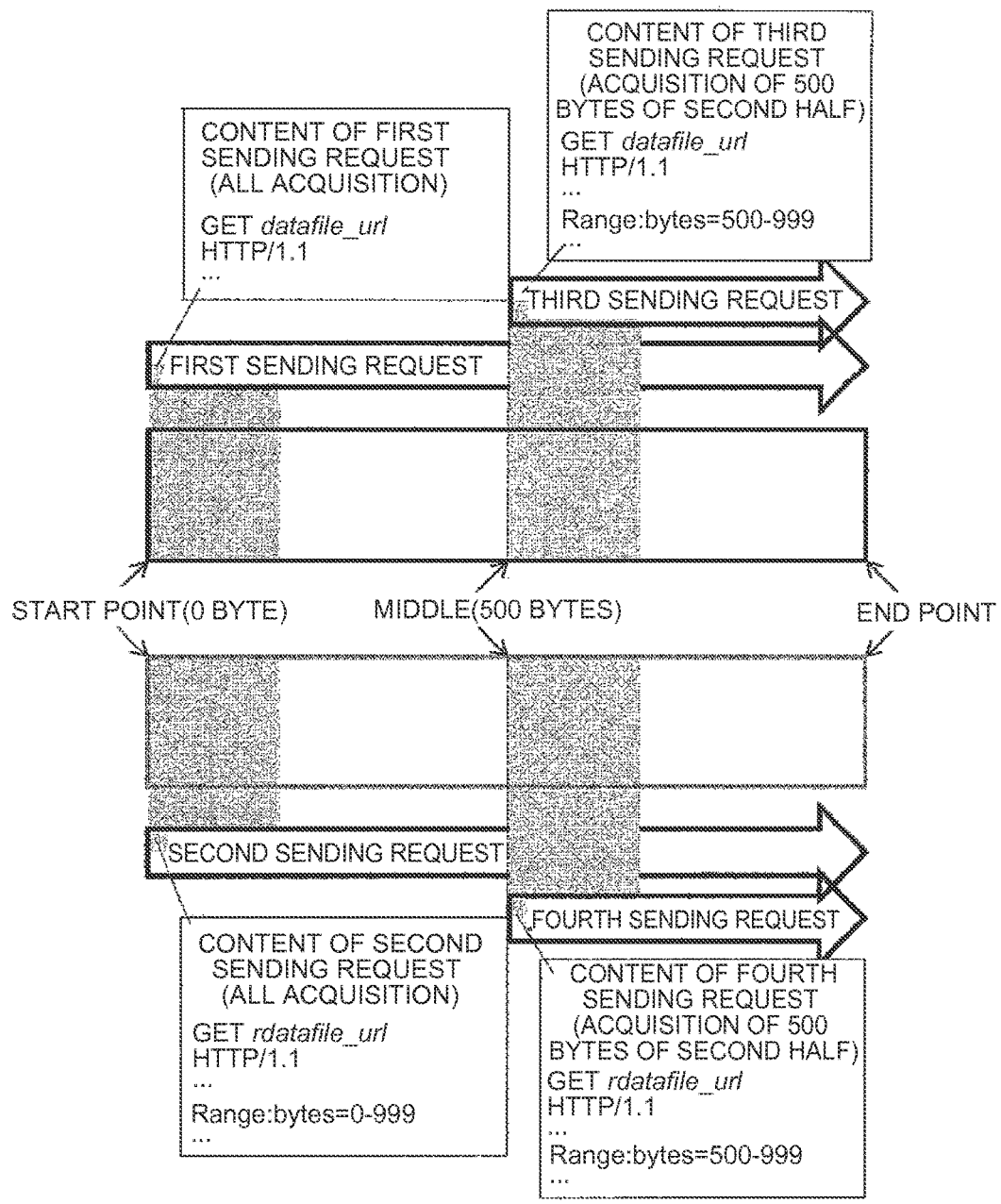
FIG. 8 is a schematic diagram of sending requests according to a third modification of the first embodiment.

FIG. 8 shows example of method for acquiring first data~fourth data of the first data file.

First, the indication unit 111C indicates the first data sending request and the second data sending request. A method for indicating the first data sending request and the second data sending request is same as that of the modification 2 of the first embodiment. Accordingly, its explanation is omitted.

Next, the request sending unit 112C sends the first data sending request and the second data sending request indicated by the indication unit 111C.

In the communication apparatus 110C, the data receiving unit 113B receives the first data and the second data in order.

Next, the indication unit 111C indicates a third data sending request and a fourth data sending request.

As the third data sending request, a data file specified with datafile_url in FIG. 8 is indicated by HTTP GET request, and a data range is specified by Range header. Specifically, as the data file, datafile_url is indicated, and the data range from 500 bytes to 999 bytes are indicated. Furthermore, as the fourth data sending request, a data file specified with datafile_url in FIG. 8 is indicated by HTTP GET request, and a data range is specified by Range header. Specifically, as the data file, rdatafile_url is indicated, and the data range from 500 bytes to 999 bytes is indicated.

Next, the request sending unit 112C sends the third data sending request and the fourth data sending request indicated by the indication unit 111C.

After receiving the third data sending request, the server 120B sends the indicated data file datafile_url from 500 bytes toward 999 bytes. Furthermore, after receiving the fourth data sending request, the server 120B sends the indicated data file rdatafile_url from 500 bytes toward 999 bytes.

In the communication apparatus 110C, the data receiving unit 113C receives the third data and the fourth data in order.

After receiving the first data~the fourth data, the write control unit 114B reconstructs the first data file by using the first data~the fourth data.

In the system of the modification 3 of the first embodiment, the same effect as the system of the modification 2 of the first embodiment can be accomplished. Furthermore, in the communication apparatus 110C of the modification 3 of the first embodiment, after sending data sending requests, additional data sending requests are sent. Accordingly, data in the data file can be further effectively acquired.

Modification 4 of the First Embodiment

In the first embodiment, and the modifications 1-3 thereof, respective functions of the communication apparatus and the server can be exchanged.

Namely, the server sends a data sending request to the communication apparatus, and receives data as a reply of the sending request.

In this case, for example, in FIG. 1 or FIG. 6, by exchanging the respective functions of the communication apparatus and the server, a system of the modification 4 can be composed by the same component of FIG. 1 or FIG. 6.

Figure 9:
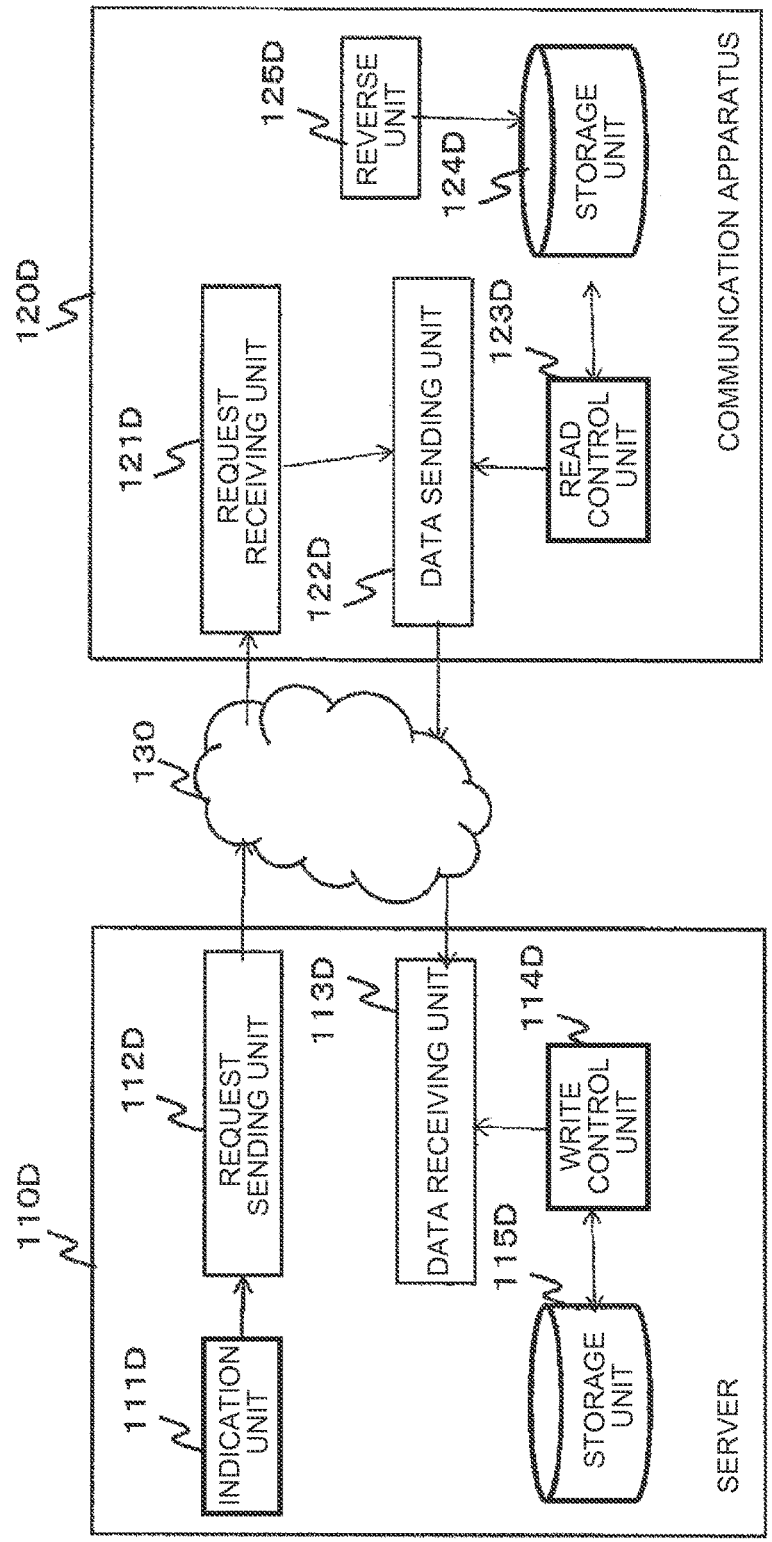
FIG. 9 is a block diagram of a system according to a fourth modification of the first embodiment.

FIG. 9 is a block diagram of the system of the modification 4 of the first embodiment.

A server 110D has a function almost same as that of the communication apparatus 110B in FIG. 6.

In the server 110D, different from the request sending unit 112B of the communication apparatus 110 in FIG. 1, a request sending unit 112D sends a data sending request by using a method different from GET method. The request sending unit 112D sends the data sending request by using, for example, WebSocket, polling (such as Ajax), or long-polling (such as Comet).

In case of WebSocket, the server 110D sends the data sending request by using a connection established between the communication apparatus 120D and the server 110D. In case of polling, the server 110D sends the data sending request as a reply of a message acquisition request periodically sent from the communication apparatus 120D. In case of long-polling, the server 110D sends the data sending request for the message acquisition request at a timing desired by the server 110D.

Here, in the data sending request sent by the server 110D, the server 110D may indicate a data file or a data range to be acquired in the data file. Furthermore, the data sending request may include URL of acceptance destination for the server 110D to accept the data file.

According to the system of the modification 4 of the first embodiment, in case that the server acquires a plurality of data from the communication apparatus in parallel, the same effect as the first embodiment and modifications 1-3 thereof can be accomplished.

The server 110D can be realized by using a general purpose computer device as a basic hardware. Namely, the indication unit 111D, the request sending unit 112D, the data receiving unit 113D, the write control unit 114D, and the storage unit 115D can be realized by a processor (loaded onto the computer device) executing a program. Here, the server 110D may be realized by previously installing the program into the computer device. Furthermore, by storing the program into a memory medium such as CD-ROM or by distributing the program via a network, the server 110D may be realized by suitably installing the program into the computer device. Furthermore, the storage unit 115D can be realized by suitably utilizing a memory (or a hard disk) internal or external to the computer device, or a memory medium such as CD-R, CD-RW, DVD-RAM or DVD-R.

The Second Embodiment

Figure 10:
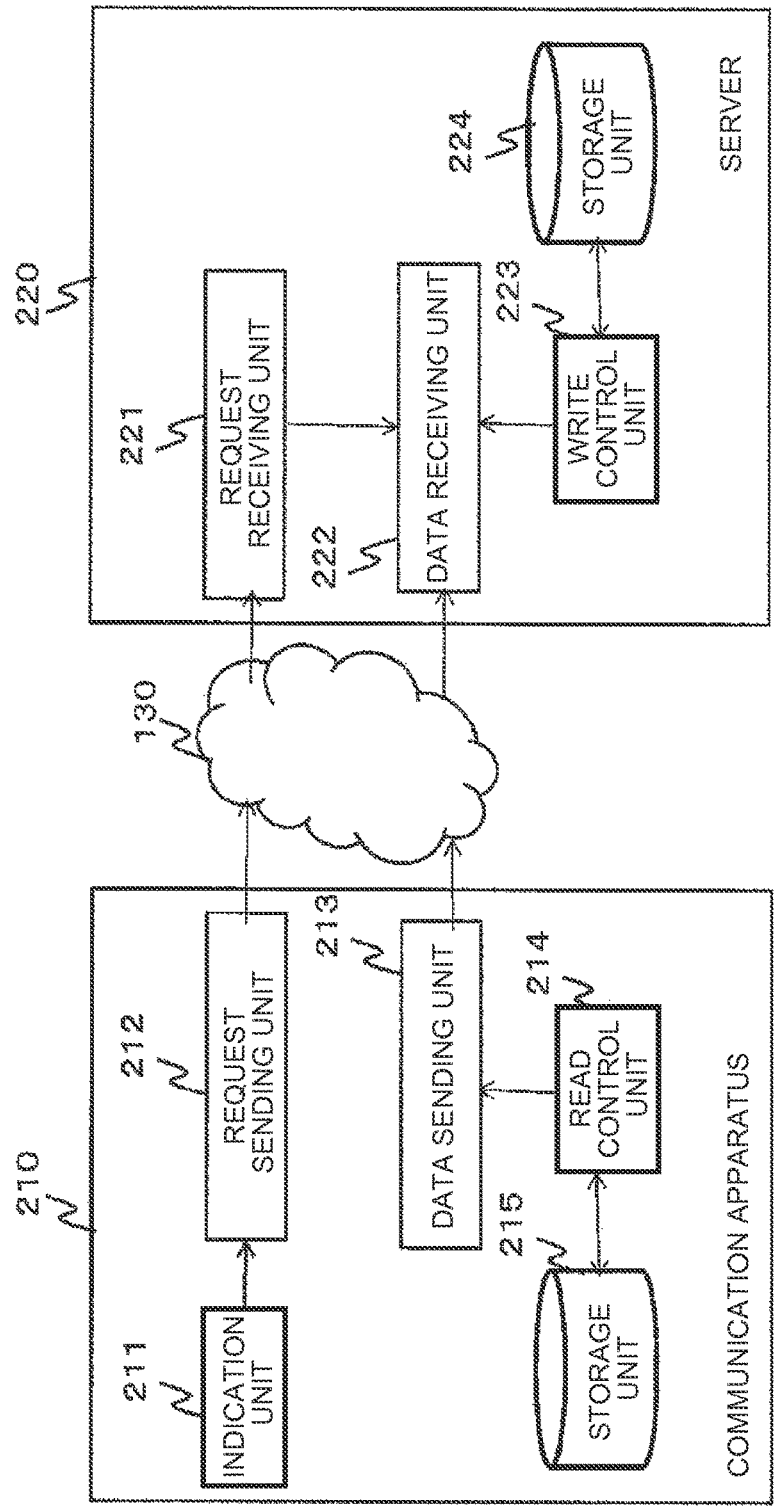
FIG. 10 is a block diagram of a system according to a second embodiment.

FIG. 10 is a block diagram of a system according to the second embodiment. The system of FIG. 10 includes a communication apparatus 210, a server 220, and a network 130. The communication apparatus 210 communicates with the server 220 via the network 130.

In the system of the second embodiment, the communication apparatus 210 sends PUT request (data receiving request) and data to the server 220, which is different from the first embodiment (data is acquired by sending GET request).

The communication apparatus 210 includes an indication unit 211, a request sending unit 212, a data sending unit 213, a read control unit 214, and a storage unit 215.

The indication unit 211 indicates a first data receiving request which requests the server 220 to receive data from a first position (a start position in a first data file) to a second position (an end position in the first data file). The indication unit 211 indicates a second data receiving request which requests the server 220 to receive data from the second position (the end position in the first data file) to the first position (the start position in the first data file).

The indication unit 211 indicates the first data receiving request by PUT request of HTTP (Hyper Text Transfer Protocol). In PUT request, which data file (destination in the server) to accept data is indicated by URL. Furthermore, the indication unit 211 indicates the second data receiving request by PUT request of HTTP, and indicates which data file (destination in the server) to accept data by URL. Furthermore, as to the second data sending request, by extending a method for indicating a range to send data with Range header, the sending method is indicated. This method is explained by referring to FIG. 11. The indication unit 211 indicates to send data from 999 bytes (end position of a data file) to 0 byte (start position of the data file) along reverse direction (from 999 bytes toward 0 byte) with Range header. This indication method is not imagined under standard specification of current HTTP protocol. In the standard specification of current HTTP protocol, the indication method with Range header indicates from a start position of the data file toward an end position thereof as bytes. On the other hand, in the second embodiment, by Range header, data of the data file is indicated to be sent along reverse direction as rbytes. Moreover, the method for indicating to send data along reverse direction is not limited to this method. For example, another new word except for rbytes may be defined. New request command or option header may be defined to be identifiable. Furthermore, a method for describing numerals and signs of indicated range may be changed without changing an indicated part as bytes. For example, the range may be indicated as "Range:bytes-999-0".

The request sending unit 212 sends the first data receiving request and the second data receiving request to the server 220. These receiving requests may be sent at the same time or at different timings. For example, these sending requests are sent by PUT request of HTTP (Hyper Text Transfer Protocol).

The data sending unit 213 sends first data indicated by the first data receiving request to the server 220. The data sending unit 213 sends second data indicated by the second data receiving request to the server 220. The data sending unit 213 may respectively send the first data and the second data with the first data receiving request and the second data receiving request (sent by the request sending unit 212).

The read control unit 214 reads the first data and the second data from the storage unit 215, and makes the data sending unit 213 to send them. When the data sending unit 213 sends the first data from a first position (start position) to a third position and the second data from a second position (end position) to the third position, the read control unit 214 may make the data sending unit 213 stop sending the first data and the second data. For example, when a sending range of the first data overlaps a sending range of the second data, the read control unit 214 may make the data sending unit 213 stop sending. In an example of FIG. 11, at timing when the first data is sent to 700 bytes and the second data is sent to 700 bytes, the read control unit 214 may make the data sending unit 213 stop sending the first data and the second data. Moreover, the second data need not be sent to 700 bytes. When the second data is sent to 701 bytes, the read control unit 214 may make the data sending unit 213 stop sending the first data and the second data. Namely, the read control unit 214 had better only send all the first data file by the first data and the second data, and need not send overlap data of the first data and the second data.

The storage unit 215 stores the first data file (first data and second data). Here, the storage unit 215 may be a storage or a buffer such as a memory.

The server 220 includes a request receiving unit 221, a data receiving unit 222, a write control unit 223, and a storage unit 224.

When the request receiving unit 221 receives a receiving request of the first data file from the communication apparatus 210, the request receiving unit 221 indicates the data receiving unit 222 to receive data of the receiving request.

The data receiving unit 222 receives data according to the receiving request indicated by the request receiving unit 221, and writes the data into the indicated destination (data file) of the storage unit 224 via the write control unit 223.

The read control unit 223 reconstructs the first data file by reversing and connecting the received data. As to reconstruction of data file, the data receiving unit 222 may reverse and connect data while the data is being received. Alternatively, after receiving data, the data receiving unit 222 may reverse and connect.

The storage unit 224 stores the first data file. The storage unit 224 may be a storage or a buffer such as a memory. Here, the write control unit 223 may store the first data and the second data into the storage unit 224, and reconstruct the first data file after storing into the storage unit 224.

Figure 11:
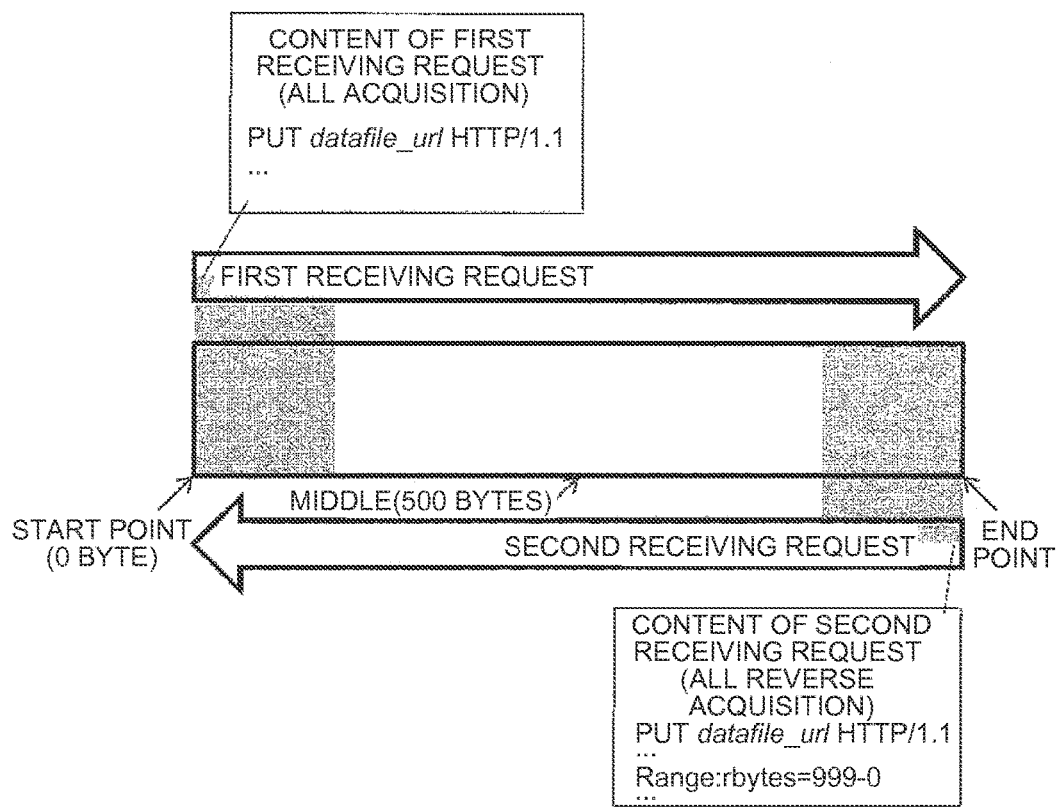
FIG. 11 is a schematic diagram of a first data receiving request of a first data file and a second data sending request of a second data file.

Next, by referring to FIG. 11, concrete example of operation of the system of the second embodiment will be explained. FIG. 11 is a schematic diagram showing a method for sending the first data and the second data of the first data file.

First, the indication unit 211 indicates a first data receiving request and a second data receiving request. As the first data receiving request, a data file specified with datafile_url in FIG. 11 is indicated by HTTP PUT request. Specifically, as the data file, datafile_url is indicated. Furthermore, as the second receiving request, a data file specified with datafile_url in FIG. 11 is indicated by HTTP PUT request. Furthermore, a request to receive data from an end position of the data file to a start position thereof is indicated by Range header. Specifically, by Range header, the data file from 999 bytes (an end position of the data file) to 0 byte (a start position of the data file) is indicated to be sent along reverse direction. In an example of FIG. 11, the data file is indicated by representation "Range:rbyetes=999-0".

The request sending unit 212 sends the first data receiving request and the second data receiving request indicated by the indication unit 211. The first data receiving request and the second data receiving request may be sent at the same timing or at different timings.

In the communication apparatus 210, the data sending unit 213 sends the first data and the second data in order.

When the read control unit 214 detects that the data sending unit 213 sends data of the first data sending request and data of the second data sending request to overlap position, the read control unit 214 may make the data sending unit 213 stop sending the first data and the second data. For example, at timing when data of the first data sending request is sent to 700 bytes and data of the second data sending request is sent to 700 bytes, the read control unit 214 makes the data sending unit 213 stop sending data. Here, the second data need not be sent to 700 bytes. When the second data is sent to 701 bytes, the read control unit 214 may make the data sending unit 213 stop sending the first data and the second data. Namely, the read control unit 214 had better only send all the first data file by the first data and the second data, and need not send overlap data of the first data and the second data.

When receiving the first data receiving request, the server 220 receives the data file datafile_url (indicated as the destination) from the start position (0 byte) to the end position (999 bytes). Furthermore, when receiving the second data receiving request, the server 220 receives the data file datafile_url (indicated as the destination) from the end position (999 bytes) to the start position (0 byte).

In the server 220, when the data receiving unit 222 receives respective data of the first data receiving request and the second data receiving request, the write control unit 223 stores the first data and the second data into the storage unit 224 according to the receiving requests. Here, the write control unit 223 may store the first data and the second data (as it is) into the storage unit 224. Alternatively, the write control unit 223 may reconstruct the first data file and store it into the storage unit 224.

The communication apparatus 210 can be realized by using a general purpose computer device as a basic hardware. Namely, the indication unit 211, the request sending unit 212, the data sending unit 213, the read control unit 214, and the storage unit 215 can be realized by a processor (loaded onto the computer device) executing a program. Here, the communication apparatus 210 may be realized by previously installing the program into the computer device. Furthermore, by storing the program into a memory medium such as CD-ROM or by distributing the program via a network, the communication apparatus 210 may be realized by suitably installing the program into the computer device. Furthermore, the storage unit 215 can be realized by suitably utilizing a memory (or a hard disk) internal or external to the computer device, or a memory medium such as CD-R, CD-RW, DVD-RAM or DVD-R.

According to the communication apparatus 210 of the second embodiment, the server 220 is required to receive data from a start position of the data file to an end position thereof, and to receive data from the end position to the start position. As a result, in case of sending a plurality of data in parallel, data in the data file can be effectively sent. Even if a speed to send data of the first data sending request is different from a speed to send data of the second data sending request, a sending data range of the first data receiving request and a sending data range of the second data receiving request are forwarded along mutual reverse direction in the data file. The respective sending data ranges are overlapped at some timing. Accordingly, data of the data file can be effectively sent.

Modification 1 of the Second Embodiment

Next, modification 1 of the second embodiment will be explained. A system component of the modification 1 of the second embodiment is same as that of FIG. 10.

In a communication apparatus 210A of the modification 1 of the second embodiment, after sending a first data receiving request from a start position of the data file to an end position thereof and a second data receiving request from the end position to the start position, another data sending request is additionally sent, which is different from the communication apparatus 210 of the second embodiment.

In the communication apparatus 210A, respective functions of an indication unit 211A, a request sending unit 212A, a data sending unit 213A, and a read control unit 214A, are different from those of the communication apparatus 210 of the second embodiment.

In addition to a function of the indication unit 211 of the second embodiment, the indication unit 211A further indicates a third data receiving request to requests the server 220 to receive data from a third position (between a first position (start position) and a second position (end position) of the first data file) to the second position (end position). Furthermore, the indication unit 211A further indicates a fourth data receiving request to request the server 220 to receive data from the third position to the first position (start position) of the first data file. As a method for indicating the third position, a plurality of methods can be applied. As a first example, the third position is indicated as a middle position between the first position (start position of data file) and the second position (end position of data file) (Refer to FIG. 12). As a second example, the third position is indicated based on a speed to send the first data and a speed to send the second data by the data sending unit 213a (refer to FIG. 13).

In addition to a function of the request sending unit 212 of the first embodiment, the request sending unit 212A has a function to send the third data receiving request and the fourth data receiving request. Timing to send the third data receiving request and the fourth data receiving request are, for example, a first timing between after the data sending unit 213A starts to receive first data and second data and before sending of the first data and the second data is completed. Timing is not limited to the first timing. The third data sending request and the fourth data sending request may be sent at the same timing or at different timings.

The data sending unit 213A sends first data~fourth data corresponding to the first data sending request~the fourth data sending request respectively. The first data~the fourth data may be sent with the first data sending request~the fourth data sending request respectively.

At timing when the data sending unit 213A sends the first data from a first position (start position of data file) to a fourth position and the fourth data from the third position to the fourth position, the read control unit 214A may make the data sending unit 213A stop sending the first data and the fourth data. At timing when the data sending unit 213A sends the second data from a second position (end position of data file) to a fifth position and the third data from the third position to the fifth position, the read control unit 214A may make the data sending unit 213A stop sending the second data and the third data. Furthermore, if a speed for the data sending unit 213A to send the first data (or the second data) after starting to send the third data is slower than that before starting to send the third data, the read control unit 214A may make the data sending unit 213A stop sending the third data. Furthermore, if a speed for the data sending unit 213A to send the first data (or the second data) is slower than that before starting to send the fourth data, the read control unit 214A may make the data sending unit 213A stop sending the fourth data.

Next, concrete example of operation of the communication apparatus 210A will be explained. Two examples will be explained. By referring to FIG. 12, a first example will be explained. By referring to FIG. 13, a second example will be explained.

Figure 12:
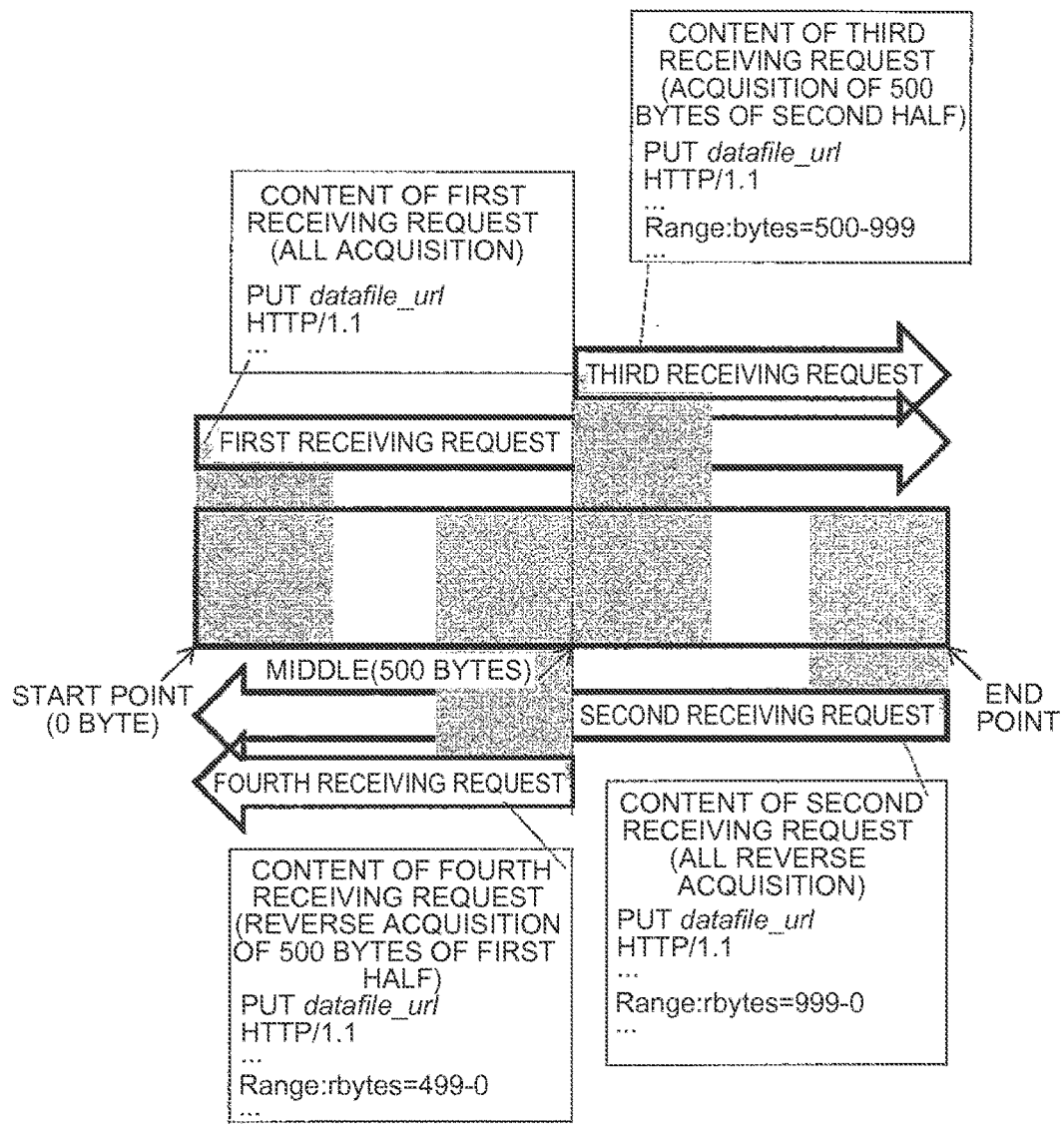
FIG. 12 is a first example of receiving requests according to a first modification of the second embodiment.

FIG. 12 shows the first example of a method for sending first data~fourth data of the first data file.

First, the indication unit 211A indicates a first data receiving request and a second data receiving request. As the first receiving request, a data file specified with datafile_url in FIG. 12 is indicated by HTTP PUT request. Specifically, as a data file, datafile_url is indicated. Furthermore, as the second data receiving request, a data file specified with datafile_url in FIG. 12 is indicated by HTTP PUT request. Furthermore, a request to receive data from an end position of the data file to a start position thereof is indicated by Range header.

Next, the request sending unit 212A sends the first data receiving request and the second data receiving request indicated by the indication unit 211A.

In the communication apparatus 210A, the data sending unit 213A sends the first data and the second data in order.

When receiving the first data receiving request, the server 220 receives the indicated data file "datafile_url" from the start position (0 byte) to the end position (999 bytes). Furthermore, when receiving the second data receiving request, the server 220 receives the indicated data file "datafile_url" from the end position (999 bytes) to the start position (0 byte).

Next, the indication unit 211A indicates a third data receiving request and a fourth data receiving request. As the third receiving request, a data file specified with datafile_url in FIG. 12 is indicated by HTTP PUT request, and a data range is specified by Range header. Specifically, as the data file, datafile_url is indicated, and the data range from 500 bytes to 999 bytes are indicated. Furthermore, as the fourth data receiving request, a data file specified with datafile_url in FIG. 12 is indicated by HTTP PUT request, and a data range is specified by Range header. Specifically, the data range from 499 bytes to 0 byte (start position of the data file) is indicated to be sent along reverse direction by Range header. In the example of FIG. 11, the data range is indicated as representation "Range:rbytes=499-0".

Next, the request sending unit 212A sends the third data receiving request and the fourth data receiving request indicated by the indication unit 211A.

In the communication apparatus 210A, the data sending unit 213 sends the third data and the fourth data in order.

By detecting that the data sending unit 213A sends data of the first data receiving request and data of the fourth data receiving request to overlap position along mutual reverse direction in the data file, the read control unit 214A may make the data sending unit 213A stop sending the first data and the fourth data. Furthermore, by detecting that the data sending unit 213A sends data of the second data receiving request and data of the third data receiving request to overlap position along mutual reverse direction in the data file, the read control unit 214A may make the data sending unit 213A stop sending the second data and the third data.

Figure 13:
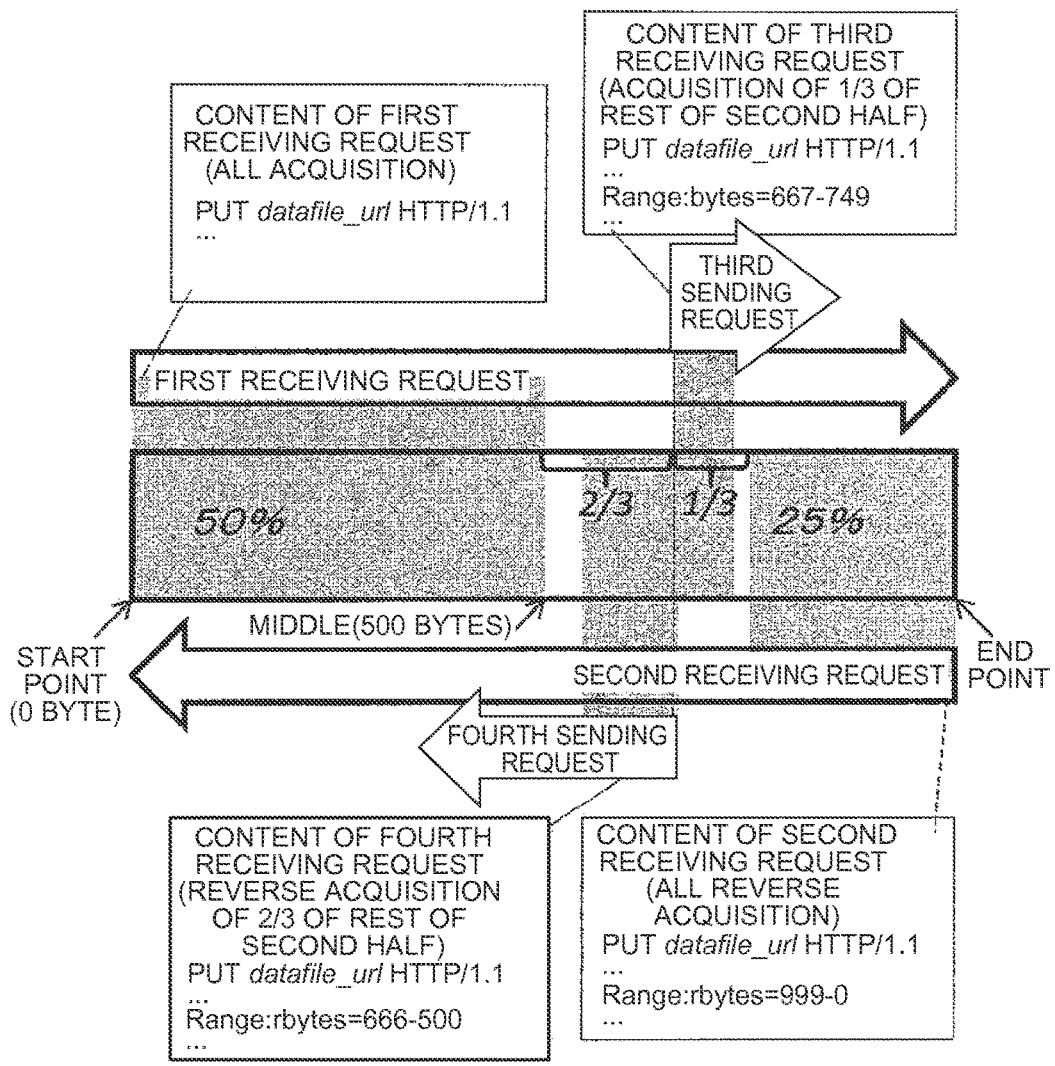
FIG. 13 is a second example of receiving requests according to the first modification of the second embodiment.

FIG. 13 shows the second example of a method for sending first data~fourth data of the first data file.

First, as to the method for indicating the first data receiving request and the second data receiving request, a function of the indication unit 211A is same as the first example. Accordingly, its explanation is omitted. A method for indicating the third data receiving request and the fourth data receiving request will be explained.

As the third data receiving request, the indication unit 211A indicates a data file specified with datafile_url in FIG.

13 by HTTP PUT request, and indicates a data range by Range header. Specifically, as the data file, datafile_url is indicated, and the data range from 667 bytes to 749 bytes are indicated. Furthermore, as the fourth data receiving request, the indication unit 211A indicates a data file specified with datafile_url in FIG. 13 by HTTP PUT request, and indicates a data range by Range header. Specifically, the data range from 666 bytes to 500 bytes is indicated to be sent along reverse direction by Range header. In the example of FIG. 13, the data range is indicated as representation "Range: rbytes=666-500". Based on a speed (measured by the data sending unit 213A) to send the first data corresponding to the first data receiving request and a speed to send the second data corresponding to the second data receiving request, the indication unit 211A indicates respective data ranges of the third data receiving request and the fourth data receiving request. In this example, a ratio of the first data sending speed to the second data sending speed is 2:1. Accordingly, the respective data ranges are indicated to match with the ratio.

Next, the request sending unit 212A sends the third data receiving request and the fourth data receiving request.

In the communication apparatus 210A, the data sending unit 213A sends the third data and the fourth data in order.

By detecting that the data sending unit 213A sends data of the first data receiving request and data of the fourth data receiving request to overlap position along mutual reverse direction in the data file, the read control unit 214A may make the data sending unit 213A stop sending the first data and the fourth data. Furthermore, by detecting that the data sending unit 213A sends data of the second data receiving request and data of the third data receiving request to overlap position along mutual reverse direction in the data file, the read control unit 214A may make the data sending unit 213A stop sending the second data and the third data.

According to the communication apparatus 210A of the modification 1 of the second embodiment, the server 220 is required to receive data from a start position of the data file to an end position thereof, and to receive data from the end position of the data file to the start position thereof. As a result, in case of sending a plurality of data in parallel, data in the data file can be effectively sent, and the same effect as the communication apparatus 210 of the second embodiment can be accomplished. Furthermore, according to the communication apparatus 210A of the modification 1 of the second embodiment, after sending the data receiving request, additional data sending request of the data file is sent. Accordingly, data in the data file can be further effectively sent.

Furthermore, in the communication apparatus 210A of the modification 1 of the second embodiment, even if sending of data of the third data receiving request or the fourth data receiving request is interrupted, data (not sent yet) of the third data receiving request or the fourth data receiving request can be sent as data of the first data receiving request or the fourth data receiving request. As a result, it is not necessary to send a new data receiving request to the server 220 to receive the data (not sent yet).

Modification 2 of the Second Embodiment

Figure 14:
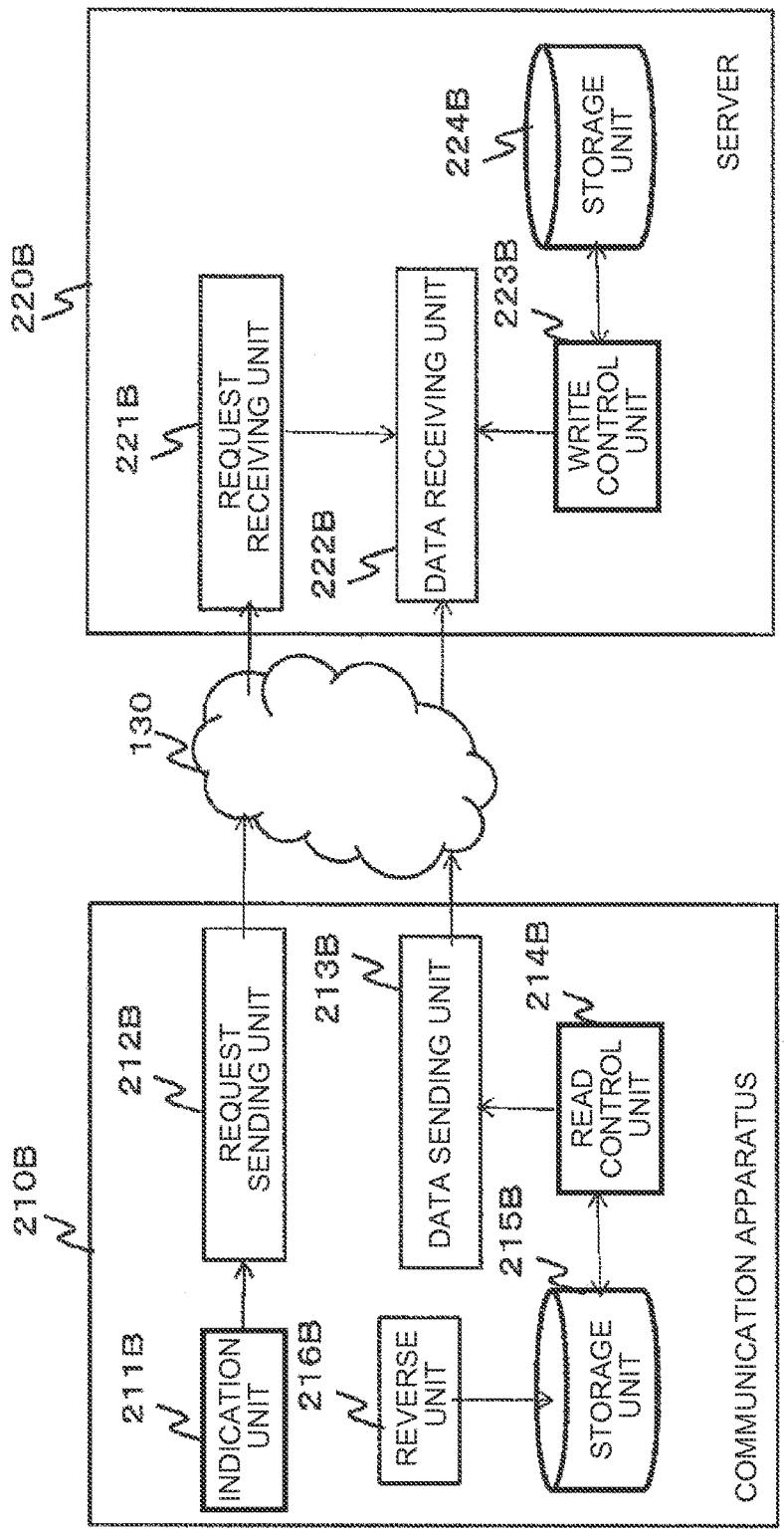
FIG. 14 is a block diagram of a system according to a second modification of the second embodiment.

FIG. 14 is a block diagram of a system of the modification 2 of the second embodiment.

Figure 15:
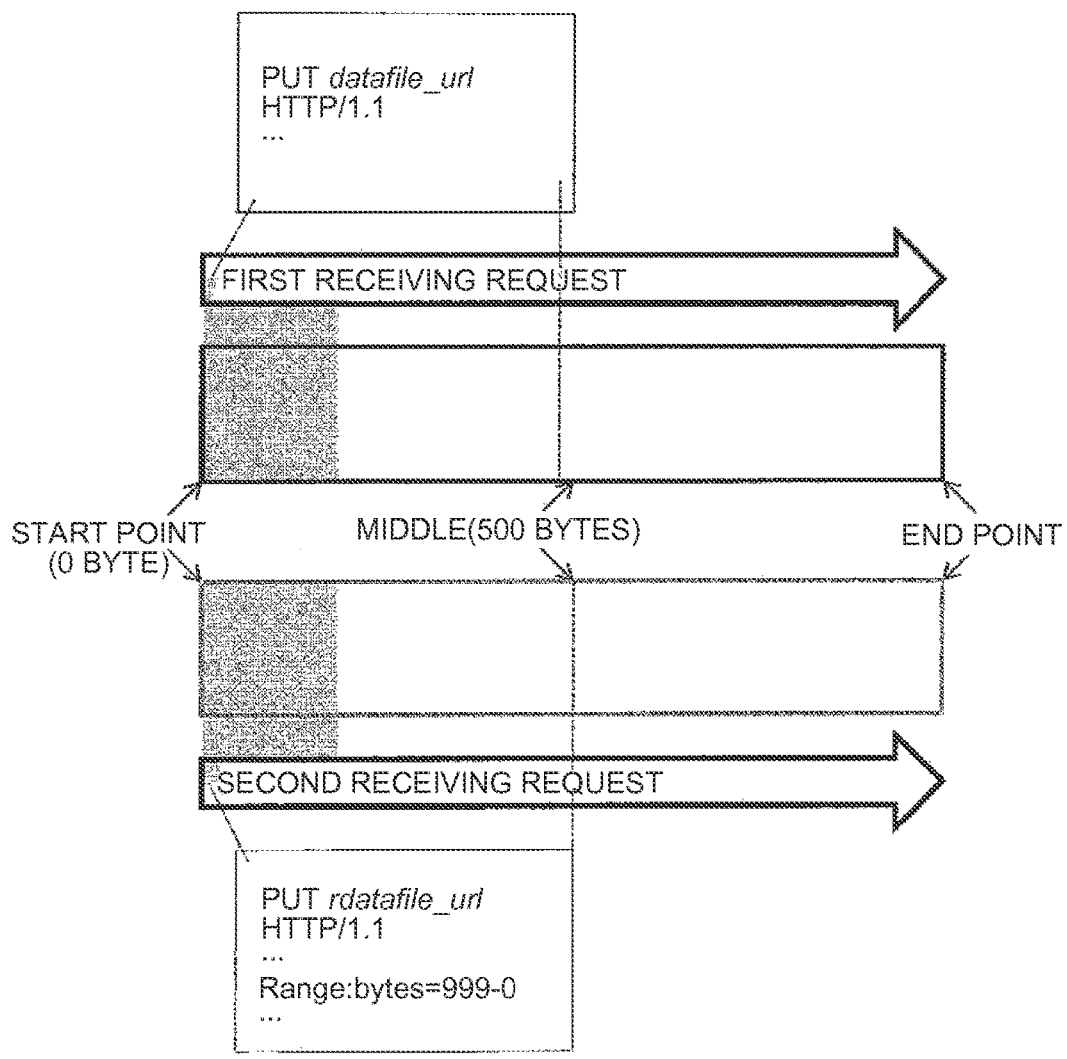
FIG. 15 is a schematic diagram of receiving requests according to the second modification of the second embodiment.

In the system of the modification 2 of the second embodiment, a server 220B preserves a first data file and a second data file which is the reversed first data file (Refer to FIG. 15). The communication apparatus 210B requests (first data receiving request) the server 220B to receive data from a start position of a first data file to an end position thereof, and requests (second data receiving request) the server 220B to receive data from a start position of a second data file to an end position thereof. The second data file is a reversed data file of the first data file. The start position of the second data file corresponds to the end position of the first data file, and the end position of the first data file corresponds to the start position of the second data file. Accordingly, in the modification 2 of the second embodiment, data is sent from the start position of the first data file toward the end position thereof, and data is sent from the end position of the first data file toward the start position thereof, which is common to the second embodiment. In the modification 2 of the second embodiment, by normally sending HTTP PUT request from the communication apparatus 210B, the same effect as the communication apparatus 210 of the first embodiment can be realized. This specific feature is different from the communication apparatus 210 of the second embodiment. Namely, in the modification 2 of the second embodiment, instead of the data receiving request to send data along reverse direction from an end position to a start position of the first data file, a data receiving request to send data along forward direction from a start position to an end position of the second data file (reversed first data file) can be performed.

In the communication apparatus 210B, respective functions of an indication unit 211B, a request sending unit 212B, a data sending unit 213B, a read control unit 214B and a storage unit 215B, are different from those of the indication unit 211, the request sending unit 212, the data sending unit 213, the read control unit 214 and the storage unit 215 of the communication apparatus 210 of the second embodiment.

In the server 220B, respective functions of a request receiving unit 221B, a data receiving unit 222B, a write control unit 223B and a storage unit 224B, are different from those of the request receiving unit 221, the data receiving unit 222, the write control unit 223 and the storage unit 224 of the server 220 of the second embodiment.

The indication unit 211B indicates a first data receiving request to request the server 220B to receive data from a first start position of the first data file to a first end position thereof. The indication unit 211B indicates a second data receiving request to request the server 220B to receive data from a second start position of the second data file (reversed from the first data file) to a second end position thereof. For example, the second start position of the second data file corresponds to the first end position of the first data file, and the second end position of the second data file corresponds to the first start position of the first data file. For example, the indication unit 211B indicates the first data receiving request by PUT request of HTTP (Hyper Text Transfer Protocol). In PUT request, which data file to be received as a destination is indicated by URL. In the example of FIG. 15, URL is indicated as datafile_url. Furthermore, the indication unit 211B indicates the second data receiving request by PUT request of HTTP, and indicates which data file to be received as a destination by URL. In the example of FIG. 15, URL is indicated as rdatafile_url. Here, data file of rdatafile_url is a reversed data file of datafile_url. In this way, in the modification 2 of the second embodiment, two PUT requests of HTTP can be indicated as respective data receiving requests along forward direction.

The request sending unit 212B sends the first data receiving request and the second data receiving request to the server 220B. The request sending unit 212B may send the first data receiving request and the second data receiving request at the same time or at different timings. For example, the request sending unit 212B sends PUT request of HTTP (Hyper Text Transfer Protocol).

The data sending unit 213B sends first data corresponding to the first data receiving request, and sends second data corresponding to the second data sending request. The first data and the second data may be sent with the first data receiving request and the second data receiving request respectively.

At timing when the data sending unit 213B sends the first data file from the first start position to the first end position and the second data file from the second start position to the second end position (corresponding to the first start position of the first data file), the read control unit 214B may make the data sending unit 213B stop sending the first data and the second data.

The storage unit 215B stores the first data file and the second data file as the reversed first data file.

The reverse unit 216B generates the second data file by reversing the first data file, and stores into the storage unit 215B. Here, the reverse unit 216B may previously store the second data file, or may dynamically (internally, virtually) reverse the first data file when the data sending unit 213B sends data.

The server 220B includes a request receiving unit 221B, a data receiving unit 222B, a write control unit 223B, and a storage unit 224B.

Among data in the first data file stored in the communication apparatus 210B, the request receiving unit 221B receives a first data receiving request of first data from a first start position to a first end position, from the communication apparatus 210B. Among data in the second data file stored in the communication apparatus 210B, the request receiving unit 221B receives a second data receiving request of second data from a second start position to a second end position, from the communication apparatus 210B.

The data receiving unit 222B receives first data of the first data file according to the first data receiving request, and receives second data of the second data file according to the second data receiving request.

The write control unit 223B stores the first data and the second data into the storage unit 224b according to the data receiving request. The write control unit 223B may store the first data and the second data into the first data file and the second data file respectively. Furthermore, the write control unit 223B may reconstruct the first data file and store it. In case of reconstructing, as to the second data of the second data file reversed from the first data file with a predetermined method by the server 120B, the write control unit 223B reconstructs the first data file in order by reversing the second data with the predetermined method, and utilizes as partial data of the first data file. Accordingly, by combining the first data received (according to the first data receiving request) and the second data received (according to the second data sending request), the write control unit 223B can reconstruct the first data file.

The storage unit 224B stores the first data and the second data as the first data file and the second data file respectively. The storage unit 224B may store the first data file reconstructed from the first data and the second data. Here, the storage unit 224 may be a storage or a buffer such as a memory. After storing the first data and the second data into the storage unit 224B, the write control unit 223B may reconstruct the first data file.

Next, by referring to FIG. 15, concrete example of operation of the communication apparatus 210B will be explained. FIG. 15 is a schematic diagram showing a method for sending first data of the first data file and second data of the second data file.

First, the indication unit 211B indicates a first data receiving request and a second data receiving request. As the first data receiving request, a data file specified with datafile_url in FIG. 15 is indicated by HTTP PUT request. Specifically, as the data file, datafile_url is indicated. Furthermore, as the second data receiving request, a data file specified with rdatafile_url in FIG. 15 is indicated by HTTP PUT request. Specifically, as the data file, rdatafile_url is indicated.

Next, the request sending unit 212B sends the first data receiving request and the second data receiving request indicated by the indication unit 211B. The first data receiving request and the second data receiving request may be sent at the same time or at different timings.

In the communication apparatus 210B, the data sending unit 213B sends the first data and the second data in order.

At timing when the data sending unit 213B sends the first data file from the first start position to the first end position and the second data file from the second start position to the second end position (corresponding to the first start position of the first data file), the read control unit 214B makes the data sending unit 213B stop sending the first data and the second data.

When receiving the first data receiving request, the server 220B receives the indicated data file "datafile_url" from the start position (0 byte) toward the end position (999 bytes). Furthermore, when receiving the second data receiving request, the server 220B receives the indicated data file "rdatafile_url" from the end position (0 byte) toward the start position (999 bytes).

After receiving the first data and the second data, the write control unit 223B may reconstruct the first data file by using the first data and the second data.

In the modification 2 of the second embodiment, the first data file and the second data file are different data files. However, data corresponding to the second data file reversed from the first data file may be stored into the same data file as the first data file. In this case, as for each of the first data receiving request and the second data receiving request, the indication unit 211B may indicate the first data file as URL, and indicate a data range stored in the first data file by using Range header. Furthermore, as a unit to be reversed in the first data file to generate the second data file, a plurality of method can be applied. For example, a method for reversing byte/bit unit, a method for reversing a unit having arbitrary size, a method for reversing a structural unit (For example, access unit of video data) having some meaning, and a method for reversing a slice unit, can be applied. Here, by enlarging a unit to be reversed, reconstruction processing by the communication apparatus 220B is accelerated, i.e., handling easiness is often improved.

For example, if the data file has size of 1000 bytes, the data file originally storing from start 1 byte to last 1000 bytes can be reversed to a data file storing from last 1000 bytes to start 1 byte in order.

Furthermore, if data of the data file is structured with a data field, the data field of the data can be reversed as a unit. For example, if a size of the data field is fixed as 188 bytes (such as MPEG2-TS data file), the data file is reversed by a unit of 188 bytes or a unit of multiple of 188 bytes. For example, in case of 30 frames per second of each frame in video frame data, the video frame data from 1st frame to 30-th frame may be reversed along direction from 30-th frame to 1st frame, or the video frame data may be reversed per second.

Furthermore, as to a unit (to reverse the first data file), a reverse method, URL of the data file (reversed from the first data file) and data range in the data file, the communication apparatus 210B had better notify the server 220B of this information previously. For example, by storing meta data into a data file or a data base by the communication apparatus 210B, when the server 220B reconstructs the first data file, the server 220B may refer the meta data. Furthermore, the server 220B (receiving side) may previously know by any method (For example, this information is previously included in the program).

The communication apparatus 210B can be realized by using a general purpose computer device as a basic hardware. Namely, the indication unit 211B, the request sending unit 212B, the data sending unit 213B, the read control unit 214B, the storage unit 215B, and the reverse unit 216B, can be realized by a processor (loaded onto the computer device) executing a program. Here, the communication apparatus 210B may be realized by previously installing the program into the computer device. Furthermore, by storing the program into a memory medium such as CD-ROM or by distributing the program via a network, the communication apparatus 210B may be realized by suitably installing the program into the computer device. Furthermore, the storage unit 215B can be realized by suitably utilizing a memory (or a hard disk) internal or external to the computer device, or a memory medium such as CD-R, CD-RW, DVD-RAM or DVD-R.

Furthermore, the server 220B can be realized by using a general purpose computer device as a basic hardware. Namely, the request unit 221B, the data receiving unit 222B, the write control unit 223B, and the storage unit 224B, can be realized by a processor (loaded onto the computer device) executing a program. Here, the server 220B may be realized by previously installing the program into the computer device. Furthermore, by storing the program into a memory medium such as CD-ROM or by distributing the program via a network, the server 220B may be realized by suitably installing the program into the computer device. Furthermore, the storage unit 224B can be realized by suitably utilizing a memory (or a hard disk) internal or external to the computer device, or a memory medium such as CD-R, CD-RW, DVD-RAM or DVD-R.

In the system of modification 2 of the second embodiment, the communication apparatus 210B requests (first data receiving request) the server 220B to receive data from a start position of the first data file to an end position thereof, and requests (second data receiving request) the server 220B to receive data from a start position of the second data file to an end position thereof. This means that, the communication apparatus 210B sends data from the start position of the first data file to the end position thereof, and sends data from the end position of the first data file to the start position thereof. Namely, in the modification 2 of the second embodiment, by normally sending HTTP PUT request, the communication apparatus 210B can realize the same effect as the communication apparatus 210 of the second embodiment.

Modification 3 of the Second Embodiment

Next, a modification 3 of the second embodiment will be explained. A system of the modification 3 of the second embodiment is same as that of FIG. 14.

In a communication apparatus 210C of the modification 3 of the second embodiment, after sending a first data receiving request to request a server 220B to receive data from a start position of the first data file to an end position thereof and a second data receiving request to request the server 220B to receive data from a start position of the second data file (reversed from the first data file) to an end position thereof, another data sending request is additionally sent, which is different from the communication apparatus 210B of the modification 2 of the second embodiment.

In the communication apparatus 210C, respective functions of an indication unit 211C, a request sending unit 212C, and a data sending unit 213C, are different from those of the communication apparatus 210B of the modification 2 of the second embodiment.

In addition to a function of the indication unit 211B of the modification 2 of the second embodiment, the indication unit 211C further indicates a third data receiving request to receive data from a third position (between a start position (first start position) and an end position (first end position) of the first data file) to the first end position. Furthermore, the indication unit 211C indicates a fourth data receiving request to receive data from a fourth position (between a start position (second start position) and an end position (second end position) of the second data file) to the second end position. As a method for indicating the third position and the fourth position, a plurality of methods can be applied. As a first example, the third position is indicated as a middle position between the first start position and the first end position, and the fourth position is indicated as a middle position between the second start position and the second end position (Refer to FIG. 16). As a second example, the third position and the fourth position are indicated based on a speed to send the first data and a speed to send the second data by the data sending unit 213C.

In addition to a function of the request sending unit 212B of the modification 2 of the second embodiment, the request sending unit 212C has a function to send the third data receiving request and the fourth data receiving request. Timing to send the third data receiving request and the fourth data receiving request are, for example, a first timing between after the data sending unit 213C starts to send first data and second data and before sending of the first data and the second data is completed. Timing is not limited to the first timing. The third data receiving request and the fourth data receiving request may be sent at the same timing or at different timings.

The data receiving unit 213C sends first data~fourth data corresponding to the first data receiving request~the fourth data receiving request.

Next, concrete example of operation of the communication apparatus 210C will be explained.

Figure 16:
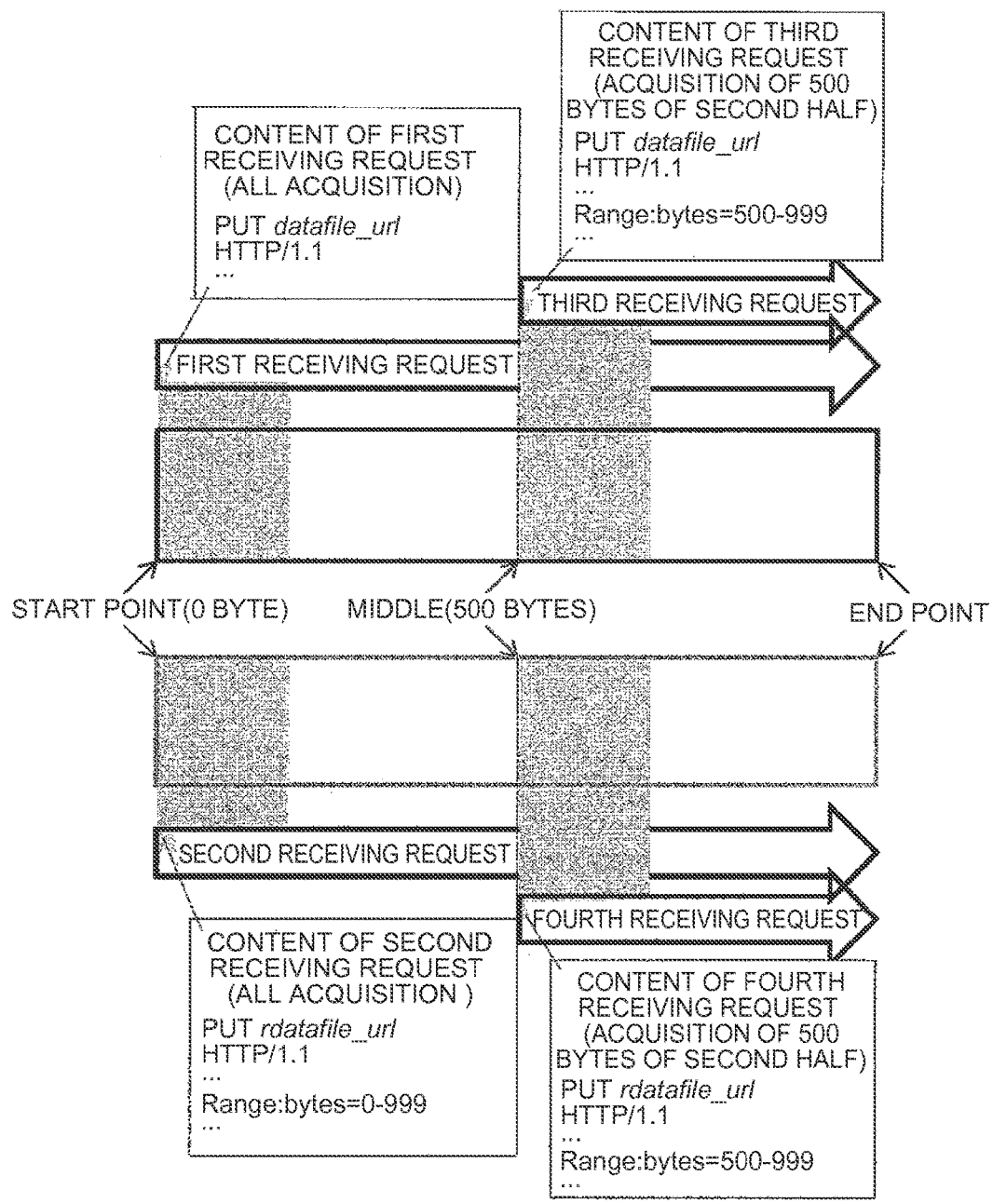
FIG. 16 is a schematic diagram of receiving requests according to a third modification of the second embodiment.

FIG. 16 shows example of method for sending first data~fourth data of the first data file.

First, the indication unit 211C indicates the first data receiving request and the second data receiving request. A method for indicating the first data receiving request and the second data receiving request is same as that of the modification 2 of the second embodiment. Accordingly, its explanation is omitted.

Next, the request sending unit 212C sends the first data receiving request and the second data receiving request indicated by the indication unit 211C.

In the communication apparatus 210C, the data sending unit 213B sends the first data and the second data in order.

Next, the indication unit 211C indicates a third data receiving request and a fourth data receiving request.

As the third data receiving request, a data file specified with datafile_url in FIG. 16 is indicated by HTTP PUT request, and a data range is specified by Range header. Specifically, as the data file, datafile_url is indicated, and the data range from 500 bytes to 999 bytes are indicated. Furthermore, as the fourth data receiving request, a data file specified with datafile_url in FIG. 16 is indicated by HTTP PUT request, and a data range is specified by Range header. Specifically, as the data file, rdatafile_url is indicated, and the data range from 500 bytes to 999 bytes is indicated.

Next, the request sending unit 212C sends the third data receiving request and the fourth data receiving request indicated by the indication unit 211C.

After receiving the third data receiving request, the server 220B receives the indicated data file datafile_url from 500 bytes toward 999 bytes. Furthermore, after receiving the fourth data receiving request, the server 220B receives the indicated data file rdatafile_url from 500 bytes toward 999 bytes.

In the server 220B, after receiving the first data~the fourth data, the write control unit 223B reconstructs the first data file by using the first data~the fourth data.

In the system of the modification 3 of the second embodiment, the same effect as the system of the modification 2 of the second embodiment can be accomplished. Furthermore, in the communication apparatus 210C of the modification 3 of the second embodiment, after sending data receiving requests, additional data receiving requests are sent. Accordingly, data in the data file can be further effectively sent.

In the second embodiment, and modifications 1-3 of the second embodiment, the data receiving request is sent by using PUT method. However, the indication method is not limited to this. For example, the data receiving request may be sent by using POST method.

Modification 4 of the Second Embodiment

In the second embodiment, and the modifications 1~3 thereof, respective functions of the communication apparatus and the server can be exchanged.

Namely, the server sends a data receiving request to the communication apparatus, and sends data corresponding to the receiving request.

In this case, for example, in FIG. 10 or FIG. 14, by exchanging the respective functions of the communication apparatus and the server, a system of the modification 4 can be composed by the same component of FIG. 10 or FIG. 14.

Figure 17:
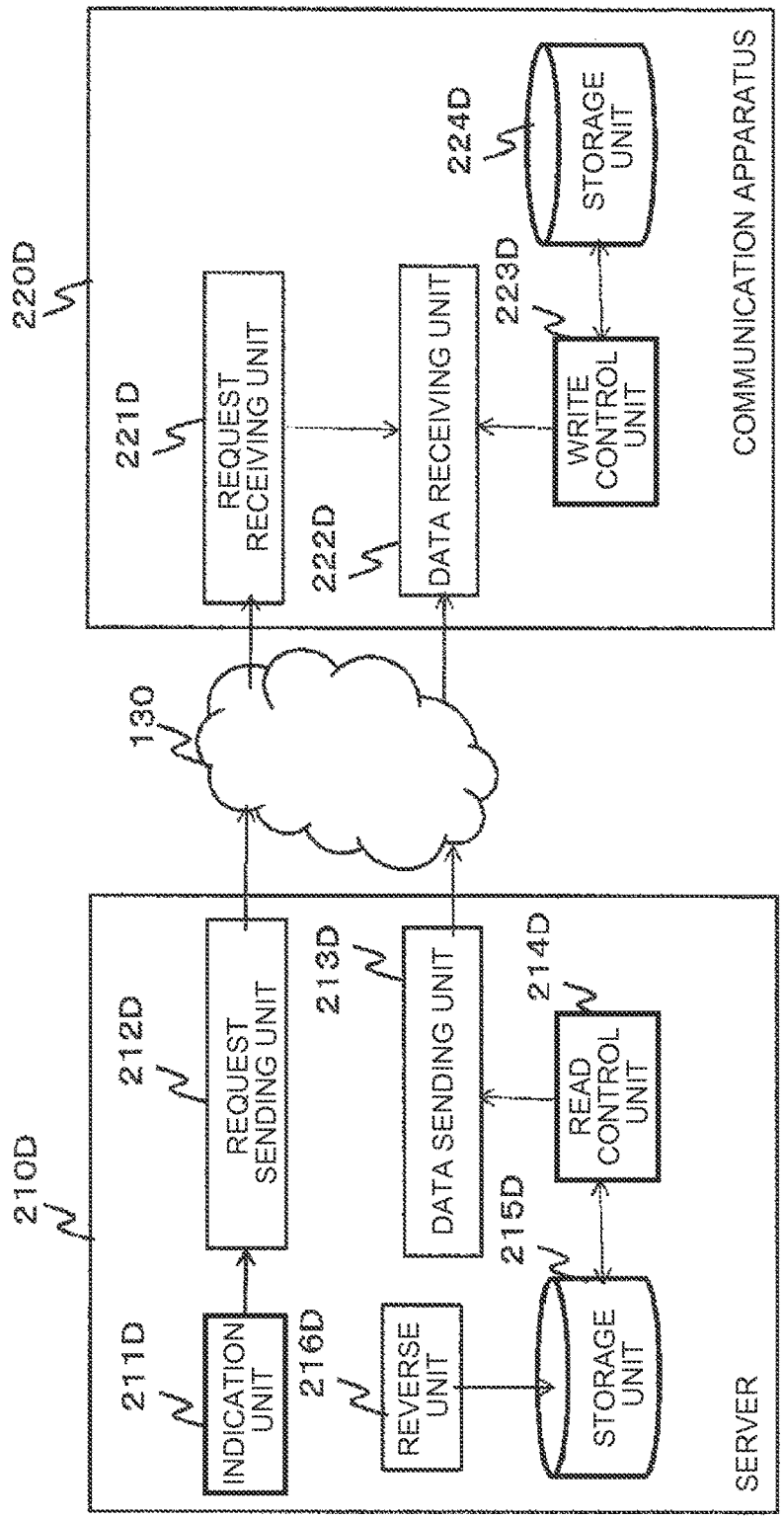
FIG. 17 is a block diagram of a system according to a fourth modification of the second embodiment.

FIG. 17 is a block diagram of the system of the modification 4 of the second embodiment.

A server 210D has a function almost same as that of the communication apparatus 210 in FIG. 10 or the communication apparatus 210B in FIG. 14.

In the server 210D, different from the request sending unit 212B of the communication apparatus 210 in FIG. 14, a request sending unit 212D sends a data receiving request by using a method different from PUT method. The request sending unit 212D sends the data receiving request by using, for example, WebSocket, polling (such as Ajax), or long-polling (such as Comet).

In case of WebSocket, the server 210D sends the data sending request by using a connection established between the communication apparatus 220D and the server 210D.

In case of polling, the server 210D sends the data receiving request as a reply of a message acquisition request periodically sent from the communication apparatus 220D.

In case of long-polling, the server 210D sends the data receiving request for the message acquisition request at a timing desired by the server 210D.

Here, in the data receiving request sent by the server 210D, the server 210D may indicate a data file or a data range to be sent in the data file. Furthermore, the data receiving request may include URL of acceptance destination for the server 210D to send the data file.

According to the system of the modification 4 of the second embodiment, in case that the server sends a plurality of data to the communication apparatus in parallel, the same effect as the second embodiment and modifications 1-3 thereof can be accomplished. The server 210D can be realized by using a general purpose computer device as a basic hardware. Namely, the indication unit 211D, the request sending unit 212D, the data sending unit 213D, the read control unit 214D, and the storage unit 215D can be realized by a processor (loaded onto the computer device) executing a program. Here, the server 210D may be realized by previously installing the program into the computer device. Furthermore, by storing the program into a memory medium such as CD-ROM or by distributing the program via a network, the server 210D may be realized by suitably installing the program into the computer device. Furthermore, the storage unit 215D can be realized by suitably utilizing a memory (or a hard disk) internal or external to the computer device, or a memory medium such as CD-R, CD-RW, DVD-RAM or DVD-R.

The Third Embodiment

Figure 18:
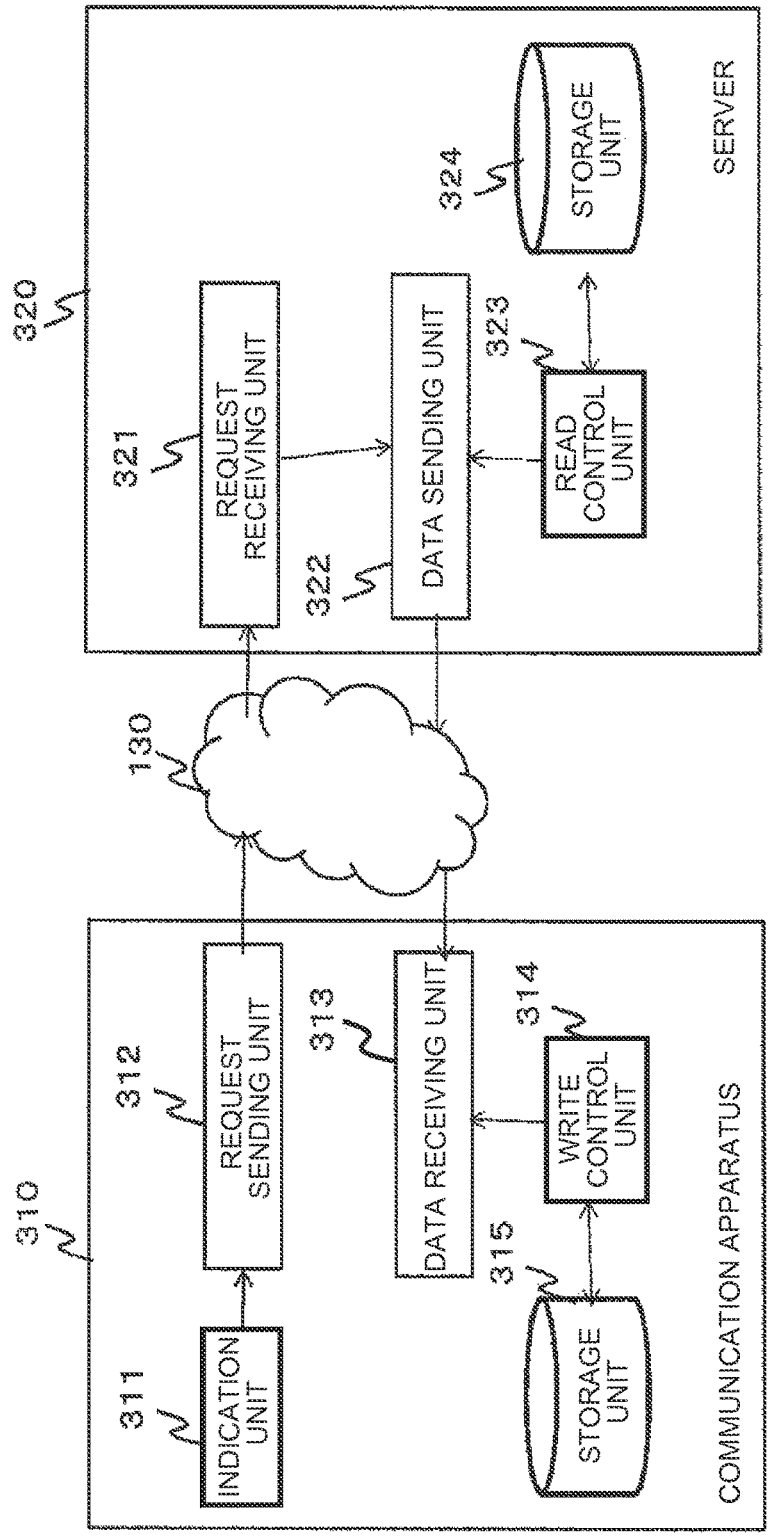
FIG. 18 is a block diagram of a system according to a third embodiment.

FIG. 18 is a block diagram of a system according to the third embodiment. The system of FIG. 18 is composed by a communication apparatus 310, a server 320, and a network 130. The communication apparatus 310 communicates with the server 320 via the network 130.

The communication apparatus 310 includes an indication unit 311, a request sending unit 312, a data receiving unit 313, a write control unit 314, and a storage unit 315.

The indication unit 311 indicates a first range in a first data file stored in the server 320. Furthermore, the indication unit 311 indicates a second range different from the first range in the first data file. For example, as the first range, the indication unit 311 indicates a range from a first position (start position of the first data file) to a second position. As the second range, the indication unit 311 indicates a range from a fourth position (middle position between the first position and a third position (end position of the first data file)) to the third position. For example, the indication unit 311 indicates a data file and a range thereof by GET request of HTTP (Hyper Text Transfer Protocol). In the Get Request of HTTP, which data file to be acquired is indicated by URL, and which range to be acquired in the data file is indicated by Range header. The indication unit 311 may dynamically indicate the second range by observing a receiving status of the data receiving unit 313, or may indicate a predetermined content.

At a first timing, the request sending unit 312 sends a sending request of a first data positioned at the first range in the first data file to the server 320. At a second timing different from the first timing, the request sending unit 312 sends a sending request of a second data positioned at the second range in the first data file to the server 320. Here, the second timing is timing between after the data receiving unit 313 starts to receive the first data and before the data receiving unit 313 completes receiving of the first data. For example, the request sending unit 312 sends GET request of HTTP (Hyper Text Transfer Protocol) protocol.

The data receiving unit 313 receives the first data and the second data from the server 320 in order.

The write control unit 314 reconstructs the first data file by connecting the first data and the second data. Here, after receiving all of the first data and the second data, the write control unit 314 may connect them. Alternatively, while the first data and the second data are being received, the write control unit 314 may connect them. If a speed for the data receiving unit 314 to receive the first data after starting to receive the second data is slower than that before starting to receive the second data, the write control unit 314 may make the data receiving unit 313 stop receiving the second data. Furthermore, if the first range and the second range (received by the data receiving unit 313) are overlapped, at timing when the data receiving unit 313 receives the first data to the third position, the write control unit 314 may make the data receiving unit 313 stop receiving the first data. Namely, when respective received data of the first data and the second data are overlapped, receiving of the first data may be stopped.

The server 320 includes a request receiving unit 321, a data sending unit 322, a read control unit 323, and a storage unit 324.

When the request receiving unit 321 receives a sending request of data in the first data file from the communication apparatus 310, the request receiving unit 321 indicates the data sending unit 322 to send data of the sending request.

The data sending unit 322 reads data (indicated by the request receiving unit 321) from the storage unit 324, and sends the data.

The read control unit 323 reads the first data file from the storage unit 324 according to an indication received by the request receiving unit 321.

The storage unit 324 stores the first data file.

Figure 19:
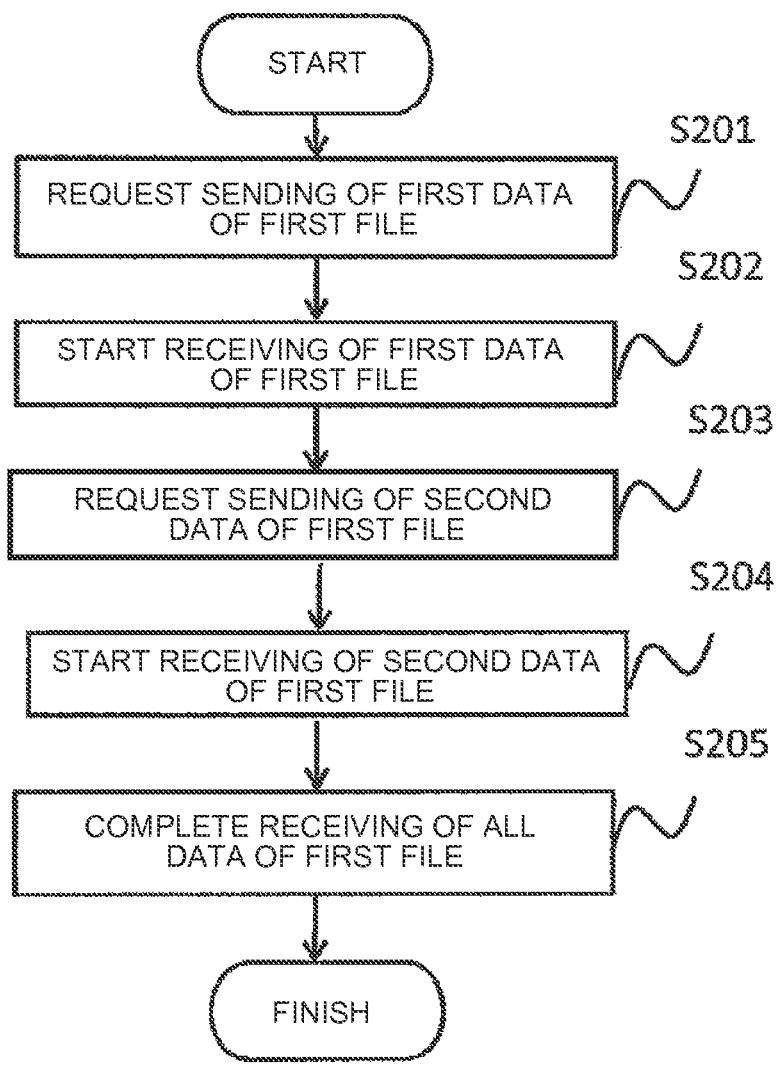
FIG. 19 is a flow chart of processing of a communication apparatus 310 in FIG. 18.
Figure 20:
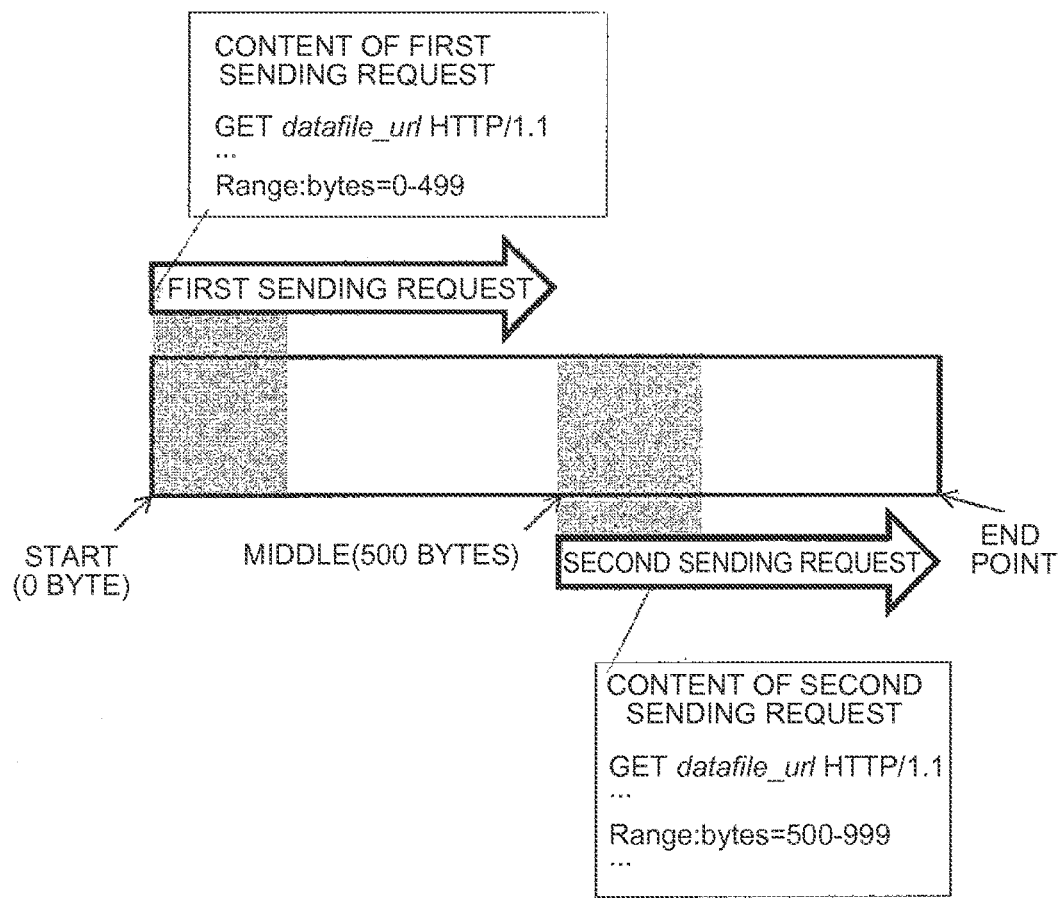
FIG. 20 is a first example of data range of data sending requests of the communication apparatus 310.

Next, by referring to FIGS. 19 and 20, concrete example of operation of the communication apparatus 310 will be explained. FIG. 19 is a Flow Chart of Processing of the Communication Apparatus 310. FIG. 20 is a schematic diagram showing a range to be acquired in the first data and the second data of the first data file.

First, the indication unit 311 indicates a data file and a range thereof (requested by a first data sending request). By HTTP GET request, in a data file specified as datafile_url in FIG. 20, the first range is indicated by Range. Specifically, datafile_url is indicated as the data file, and 0-499 bytes are indicated as the first range. An input to the indication unit 311 may be performed by a user of the communication apparatus 310, or may be previously determined by a program preinstalled.

Then, the request sending unit 312 sends the first data sending request (HTTP GET request) of the first range (indicated by the indication unit 311) in the first data file (S201). For example, the request sending unit 312 sends GET request of range (indicated by the indication unit 311) by IP packet. Here, as shown in FIG. 20, size of all of data file datafile_url is 1000 bytes. Furthermore, the first position (the start position of the first data file) corresponds to 0 byte. The second position corresponds to 499 bytes. The third position (the end position of the first data file) corresponds to 999 bytes.

When receiving the first data sending request, the server 320 starts to send data of the first range (0-499 bytes) of the indicated data file datafile_url.

In the communication apparatus 310, the data receiving unit 313 starts to receive the first data (S202).

Next, the indication unit 311 indicates a data file and a range thereof (requested by a second data sending request). Specifically, datafile_url is indicated as the data file, and 500-999 bytes are indicated as the second range. Then, the request sending unit 312 sends the second data sending request (HTTP GET request) of the second range (indicated by the indication unit 311) in the first data file (S203). Here, the fourth position corresponds to 500 bytes. The third position (the end position of the first data file) corresponds to 999 bytes.

After receiving the second data sending request, the server 320 starts to send data of the second range (500-999 bytes) of the indicated data file datafile_url.

In the communication apparatus 310, the data receiving unit 313 starts to receive the second data, and receives the first data and the second data in parallel (S204).

When the data receiving unit 313 received all of the first data and the second data are received, the data receiving unit 313 can receive all data of the first data file (S205).

Here, if a speed to receive the first data is slower by starting to receive the second data, the write control unit 314 may make the data receiving unit 313 stop receiving the second data.

Figure 21:
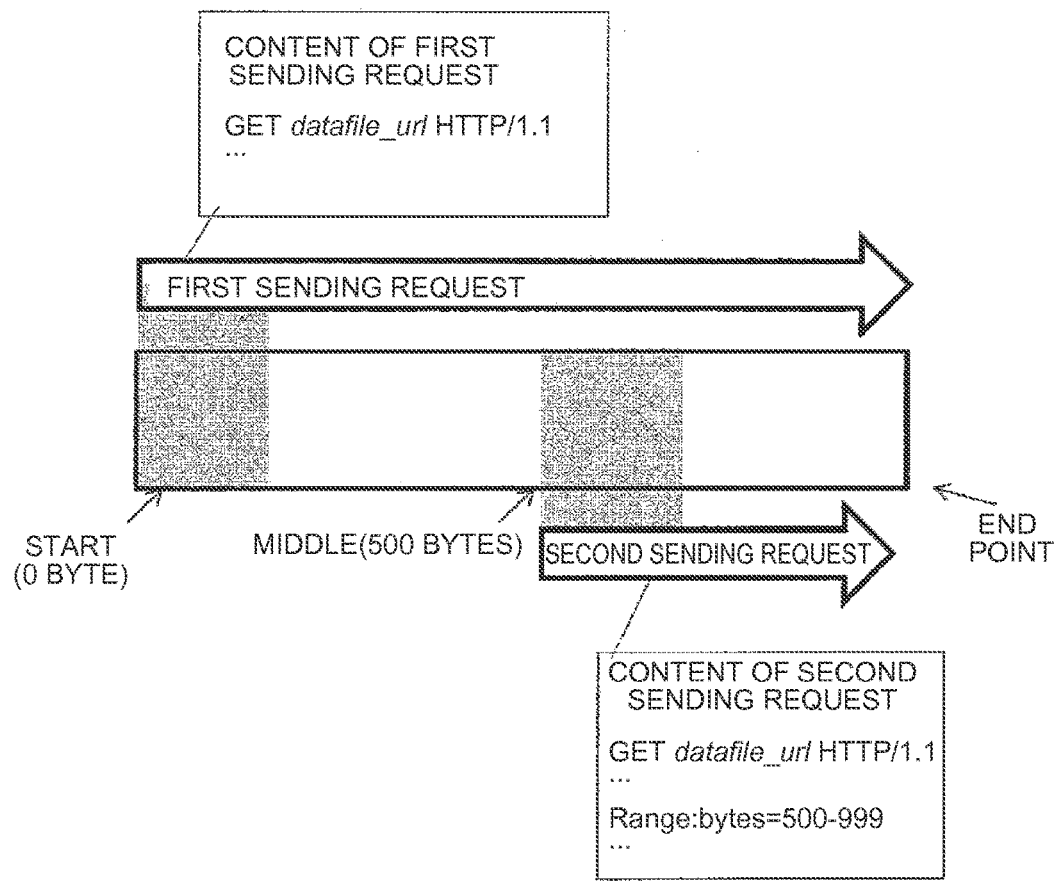
FIG. 21 is a second example of data range of data sending requests of the communication apparatus 310.

In the third embodiment, a data range indicated by the first data sending request is 0-499 bytes. However, the data range is not limited to this range. For example, the data range may be 0~800 bytes. Furthermore, in the first data sending request, the data file may be only indicated without indicating the data range therein (Refer to FIG. 21). In this case, the first data sending request is a request to send all of data file. Here, at timing when the first data is received to 499 bytes, the write control unit 314 can make the data receiving unit 313 stop receiving the first data.

In the third embodiment, the communication apparatus 310 sends the data sending request to the server 320. However, in the same way as the second embodiment, the communication apparatus 310 may send a data receiving request. Furthermore, in the modification 4 of the first embodiment, respective functions of the communication apparatus 310 and the server 320 may be exchanged. In this case, when the server 320 sends a request to the communication apparatus 310, sending of the request is realized by using WebSocket, polling (such as Ajax), or long-polling (such as Comet).

The communication apparatus 310 can be realized by using a general purpose computer device as a basic hardware. Namely, the indication unit 311, the request sending unit 312, the data receiving unit 313, the write control unit 314, and the storage unit 315 can be realized by a processor (loaded onto the computer device) executing a program. Here, the communication apparatus 310 may be realized by previously installing the program into the computer device. Furthermore, by storing the program into a memory medium such as CD-ROM or by distributing the program via a network, the communication apparatus 310 may be realized by suitably installing the program into the computer device. Furthermore, the storage unit 315 can be realized by suitably utilizing a memory (or a hard disk) internal or external to the computer device, or a memory medium such as CD-R, CD-RW, DVD-RAM or DVD-R.

According to the communication apparatus 310 of the third embodiment, after sending the first data sending request, while the first data of the data file is being received, the second data sending request is additionally sent. Accordingly, when a plurality of data is received in parallel, data in the data file can be effectively acquired. Furthermore, in the third embodiment, a range to acquire the second data is indicated from a middle position of non-acquired data in the data file. Accordingly, timing when acquisition of the first data is completed can be near to timing when acquisition of the second data is completed.

Modification 1 of the Third Embodiment

Next, a modification 1 of the third embodiment will be explained. A system component of the modification 1 of the third embodiment is same as that of FIG. 18.

In a communication apparatus 310A of the modification 1 of the third embodiment, a plurality of data sending requests of respective data ranges in the first data file is sent at the same time. After that, a data sending request for another data range in the first data file is additionally sent. In the communication apparatus 310A of the modification 1 of the third embodiment, respective functions of an indication unit 311A and a request sending unit 312A are different from those of the communication 310 of the third embodiment (Refer to FIGS. 22 and 23).

The indication unit 311A indicates a first range~a fourth range as respective different ranges in the first data file stored in the server 320. For example, as the first range, the indication unit 311A indicates a range from a first position (start position of the first data file) to a second position. As the second range, the indication unit 311A indicates a range from a fourth position (middle position between the first position and a third position (end position of the first data file)) to a fifth position. As the third range, the indication unit 311A indicates a range from a sixth position (middle position between the first position and the fourth position) to the second position. As the fourth range, the indication unit 311A indicates a range from a seventh position (middle position between the fourth position and the third position to the third position.

Figure 22:
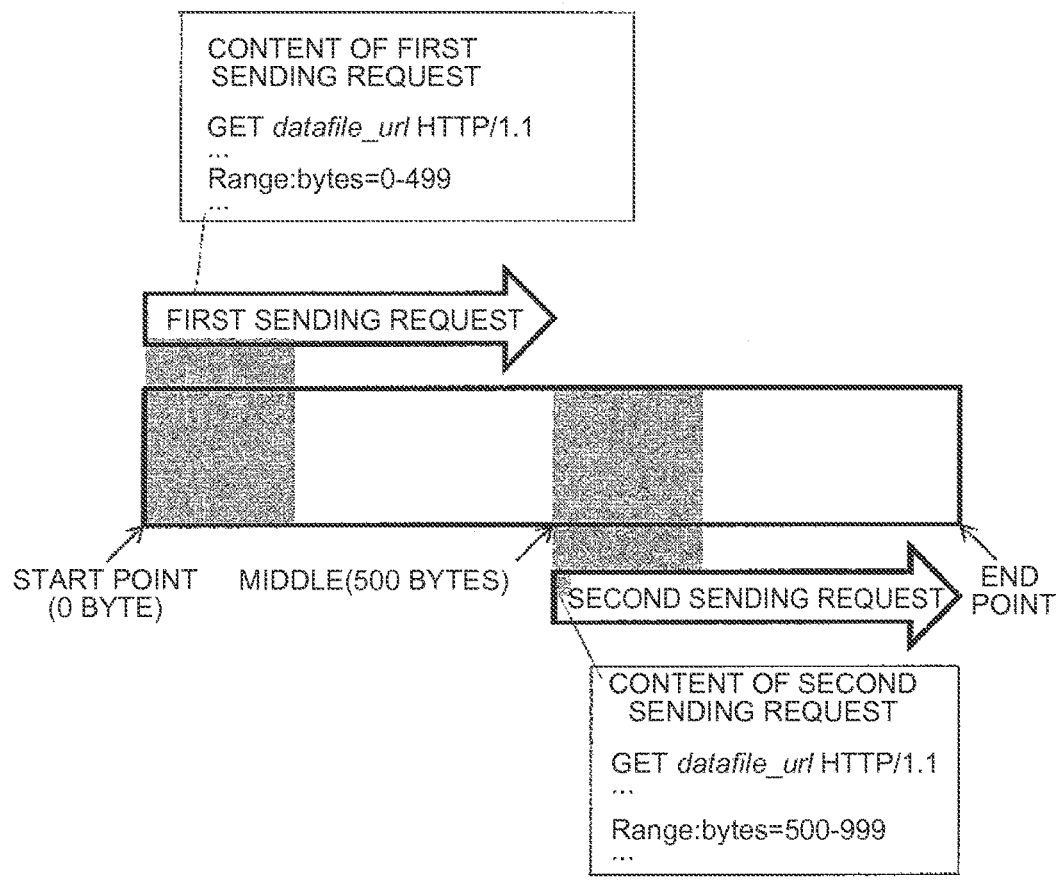
FIG. 22 is a schematic diagram of data range of a data sending request required at a first timing by a communication apparatus 310A of a first modification of the third embodiment.

At a first timing, the request sending unit 312A sends a first data sending request of the first range in the first data file to the server 320, and sends a second data sending request of the second range in the first data file to the server 320 (Refer to FIG. 22). At a second timing different from the first timing, the request sending unit 312A sends a third data sending request of the third range in the first data file to the server 320, and sends a fourth data sending request of the fourth range in the first data file to the server 320 (Refer to FIG. 23). The second timing is timing between after the data receiving unit 313A starts to receive the first data and the second data and before the data receiving unit 313A completes receiving the first data or the second data.

The data receiving unit 313A receives the first data, the second data, the third data, and the fourth data from the server 320A. The write control unit 314A reconstructs the first data file by connecting the first data, the second data, the third data, and the fourth data. Here, after receiving all of the first data, the second data, the third data and the fourth data, the write control unit 314A may connect them. Furthermore, while the first data, the second data, the third data and the fourth data are being received, the write control unit 314A may connect them.

Figure 23:
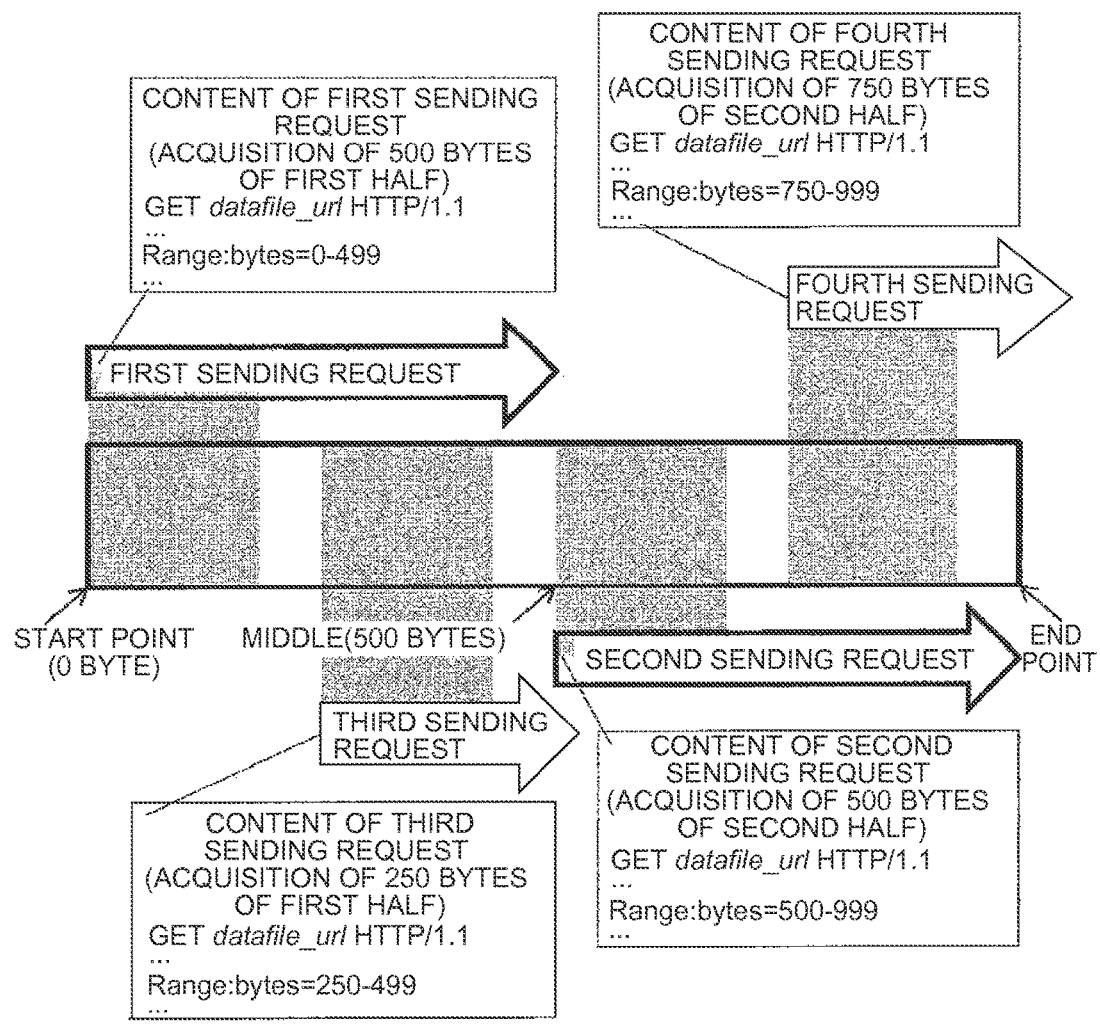
FIG. 23 is a schematic diagram of data range of a data sending request required at a second timing by the communication apparatus 310A

By referring to FIGS. 22 and 23, concrete examples of operation of the communication apparatus 310A will be explained. FIG. 22 shows a data range of a data sending request to be sent at the first timing. FIG. 23 shows a data range of a data sending request to be sent at the second timing.

First, as shown in FIG. 22, the indication unit 311A indicates a data file and a range thereof (requested by the first data sending request and the second data sending request). By HTTP GET request, in a data file specified as datafile_url in FIG. 22, the first range and the second range are indicated by Range. Specifically, datafile_url is indicated as the data file, 0-499 bytes are indicated as the first range, and 500-999 bytes are indicated as the second range. Then, the request sending unit 312A sends the first data sending request and the second data sending request (HTTP GET request) of the first range of the second range (indicated by the indication unit 311) in the first data file.

Next, as shown in FIG. 23, the indication unit 311A indicates a data file and a range thereof (requested by the third data sending request and the fourth data sending request). By HTTP GET request, in a data file specified as datafile_url in FIG. 23, the third range and the fourth range are indicated by Range. Specifically, datafile_url is indicated as the data file, 250-499 bytes are indicated as the third range, and 750-999 bytes are indicated as the fourth range. Then, the request sending unit 312A sends the third data sending request and the fourth data sending request (HTTP GET request) of the third range of the fourth range (indicated by the indication unit 311) in the first data file.

In the communication apparatus 310A, the data receiving unit 313 receives the first data~the fourth data. The write control unit 314A reconstructs the first data file by connecting the first data~the fourth data.

Here, if a speed to receive the first data or the second data is slower by starting to receive the third data or the fourth data, the write control unit 314A may make the data receiving unit 313A stop receiving the third data or the fourth data. Furthermore, at timing when the data receiving unit 313A receives the first data to 249 bytes, the write control unit 314A may makes the data receiving unit 313A stop receiving the first data. Furthermore, at timing when the data receiving unit 313A receives the second data to 749 bytes, the write control unit 314A may makes the data receiving unit 313A stop receiving the second data.

In the modification 1 of the third embodiment, a data range indicated by the first data sending request is 0~499 bytes. However, in the first data sending request, the data file may be only indicated without indicating the data range therein (Refer to FIG. 21). In this case, the first data sending request is a request to send all of data file.

According to the communication apparatus 310A of the modification 1 of the third embodiment, after sending the first data sending request and the second data sending request, while the first data and the second data are being received, the third data sending request and the fourth data sending request are additionally sent. Accordingly, when a plurality of data is received in parallel, data in the data file can be effectively acquired. Furthermore, in the modification 1 of the third embodiment, respective data ranges of the third data and the fourth are indicated from a middle position of non-acquired data in the data file. Accordingly, respective timings when acquisition of the first data~the fourth data is completed can be near.

Modification 2 of the Third Embodiment

Next, a modification 2 of the third embodiment will be explained. A system component of the modification 2 of the third embodiment is same as that of FIG. 18.

In a communication apparatus 310B of the modification 2 of the third embodiment, a plurality of data sending requests of respective data ranges in the first data file is sent at the same time. After that, a data sending request for another data range in the first data file is additionally sent. Here, another data range is determined based on a speed to receive respective data by the plurality of data sending requests. This specific feature is different from the modification 1 of the third embodiment (Refer to FIG. 25).

In the communication apparatus 310B of the modification 2 of the third embodiment, respective functions of an indication unit 311B, a request sending unit 312B, and a data receiving unit 313B, are different from those of the communication apparatus 310A of the modification 1 of the third embodiment.

The indication unit 311B indicates a first range~a second range as respective different ranges in the first data file stored in the server 320. For example, as the first range, the indication unit 311B indicates a range from a first position (start position of the first data file) to a second position. As the second range, the indication unit 311B indicates a range from a fourth position (middle position between the first position and a third position (end position of the first data file)) to a fifth position. Based on a speed to receive the first data and a speed to receive the second data by the data receiving unit 313B, the indication unit 311B determines a third range. Concrete example thereof will be explained later.

Figure 24:
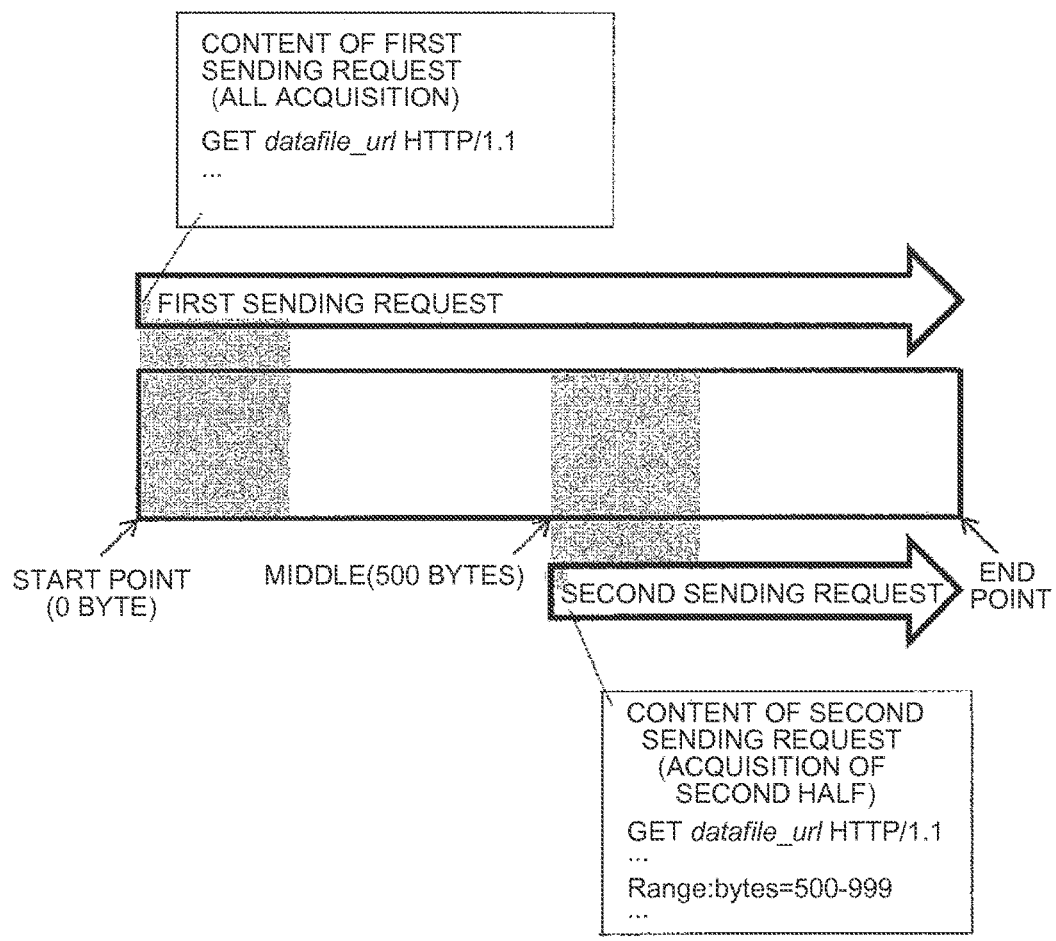
FIG. 24 is a schematic diagram of data range of a data sending request required at a first timing by a communication apparatus 310B of a second modification of the third embodiment.

At a first timing, the request sending unit 312B sends a first data sending request of the first range in the first data file to the server 320, and sends a second data sending request of the second range in the first data file to the server 320 (Refer to FIG. 24). At a second timing different from the first timing, the request sending unit 312B sends a third data sending request of the third range in the first data file to the server 320 (Refer to FIG. 25). The second timing is timing between after the data receiving unit 313B starts to receive the first data and the second data and before the data receiving unit 313B completes receiving the first data or the second data. Here, if the third data sending request is sent after receiving all data by the first data sending request, HTTP connection to be used by the third data sending request can be same as HTTP connection used by the first data sending request.

The data receiving unit 313B receives the first data, the second data, and the third data from the server 320B. Furthermore, the data receiving unit 313B measures respective receiving speed of the first data and the second data.

The write control unit 314B reconstructs the first data file by connecting the first data, the second data, and the third data.

Figure 25:
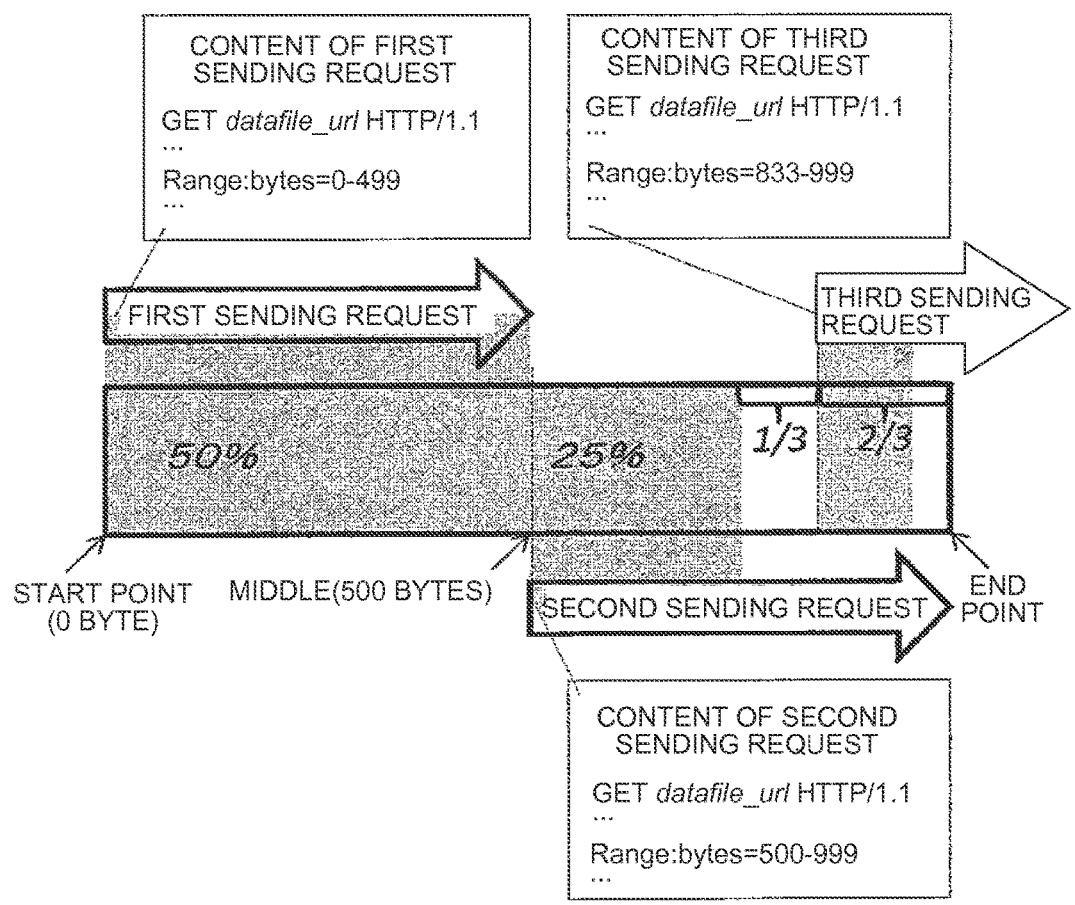
FIG. 25 is a schematic diagram of data range of a data sending request required at a second timing by the communication apparatus 310B.

By referring to FIGS. 24 and 25, concrete examples of operation of the communication apparatus 310B will be explained. FIG. 24 shows a data range of a data sending request to be sent at the first timing. FIG. 25 shows a data range of a data sending request to be sent at the second timing.

First, as shown in FIG. 24, the indication unit 311B indicates a data file and a range thereof (requested by the first data sending request and the second data sending request). By HTTP GET request, in a data file specified as datafile_url in FIG. 24, the first range and the second range are indicated by Range. Specifically, datafile_url is indicated as the data file, 0-499 bytes are indicated as the first range, and 500-999 bytes are indicated as the second range. Then, the request sending unit 312B sends the first data sending request and the second data sending request (HTTP GET request) of the first range of the second range (indicated by the indication unit 311B) in the first data file.

Next, the data receiving unit 313B receives the first data and the second data in order. Furthermore, the data receiving unit 313B measures a receiving speed or a receiving amount of the first data, and a receiving speed or a receiving amount of the second data, respectively.

Next, as shown in FIG. 25, the indication unit 311B indicates a data file and a range thereof (requested by the third data sending request and the fourth data sending request). By HTTP GET request, in a data file specified as datafile_url in FIG. 25, the third range and the fourth range are indicated by Range. Specifically, datafile_url is indicated as the data file. The indication unit 311B determines the third range based on the receiving speed of the first data and the second data, or the receiving amount of the first data and the second data. For example, as shown in FIG. 25, at timing when the first data is received from 0 byte to 749 bytes, the case that the second data is received from 500 bytes to 749 bytes is thought about. In this case, as the third range, data from 833 bytes to 999 bytes is indicated.

In example of FIG. 25, ratio of the data receiving amount by the first data sending request to the data receiving amount by the second data sending request is "2:1". Accordingly, as the third range, ⅔ of the second half of non-acquired part (750 bytes~999 bytes) is indicated. If the data receiving speed by the third data sending request is equal to the data receiving speed by the first data sending request, at timing when receiving of data by the third data sending request is completed, the receiving data amount by the second data sending request is 749 bytes. As a result, data of all data file can be effectively acquired. Here, for example, if HTTP connection to be used by the third data sending request is same as HTTP connection used by the first data sending request, the data receiving speed by the third data sending request can be equal to the data receiving speed by the first data sending request. Namely, by setting respective HTTP connections as same one, overhead to establish new connection can be removed.

The request sending unit 312B sends the third data sending request (HTTP GET request) of the third range (indicated by the indication unit 311B) in the data file.

In the communication 310B, the data receiving unit 313B further receives the second data and the third data.

The write control unit 314B reconstructs the first data file by connecting the first data~the third data.

Here, if a speed to receive the first data or the second data is slower by starting to receive the third data, the write control unit 314B may make the data receiving unit 313B stop receiving the third data.

In the modification 2 of the third embodiment, a data range indicated by the first data sending request is 0-499 bytes. However, the data range is not limited to this value. For example, in the first data sending request, the data file may be only indicated without indicating the data range therein (Refer to FIG. 24). In this case, the first data sending request is a request to send all of data file. Here, at timing when the data receiving unit 313B receives the first data to 499 bytes, the write control unit 314B can make the data receiving unit 313B stop receiving the first data.

According to the communication apparatus 310B of the modification 2 of the third embodiment, after sending the first data sending request and the second data sending request, the third data sending request is additionally sent. Especially, a data range indicated by the third data sending request is determined based on the first data receiving speed and the second data receiving speed. Accordingly, data in the data file can be effectively acquired. Furthermore, in the modification 2 of the third embodiment, the same connection can be commonly used by the first data sending request and the third data sending request. Accordingly, without overhead to establish new connection, data of the data file can be effectively acquired.

Modification 3 of the Third Embodiment

Next, a modification 3 of the third embodiment will be explained. A system component of the modification 2 of the third embodiment is same as that of FIG. 18.

In a communication apparatus 310C of the modification 3 of the third embodiment, a plurality of data sending requests of respective data ranges in the first data file is sent at the same time. After that, a data sending request for another data range in the first data file is additionally sent. Here, another data range is determined based on a speed to receive respective data by the plurality of data sending requests. In the modification 3 of the third embodiment, a method for determining the plurality of data ranges and another data range is different from the modification 2 of the third embodiment (Refer to FIG. 27).

In the communication apparatus 310C of the modification 3 of the third embodiment, respective functions of an indication unit 311C, a request sending unit 312C, and a data receiving unit 313C, are different from those of the communication apparatus 310B of the modification 2 of the third embodiment.

The indication unit 311C indicates a first range~a second range as respective different ranges in the first data file stored in the server 320. For example, as the first range, the indication unit 311C indicates a range from a first position (start position of the first data file) to a second position. As the second range, the indication unit 311C indicates a range from a fourth position (¾ position between the first position and a third position (end position of the first data file)) to a fifth position. Based on a speed to receive the first data and a speed to receive the second data by the data receiving unit 313C, the indication unit 311C determines a third range. Concrete example thereof will be explained later.

At a first timing, the request sending unit 312C sends a first data sending request of the first range in the first data file to the server 320C, and sends a second data sending request of the second range in the first data file to the server 320C. At a second timing different from the first timing, the request sending unit 312C sends a third data sending request of the third range in the first data file to the server 320C (Refer to FIG. 27). The second timing is timing between after the data receiving unit 313C starts to receive the first data and the second data and before the data receiving unit 313C completes receiving the first data or the second data. Here, if the third data sending request is sent after receiving all data by the second data sending request, HTTP connection to be used by the third data sending request can be same as HTTP connection used by the second data sending request.

The data receiving unit 313C receives the first data, the second data, and the third data from the server 320C. Furthermore, the data receiving unit 313C measures respective receiving speed of the first data and the second data.

The write control unit 314C reconstructs the first data file by connecting the first data, the second data, and the third data.

Figure 26:
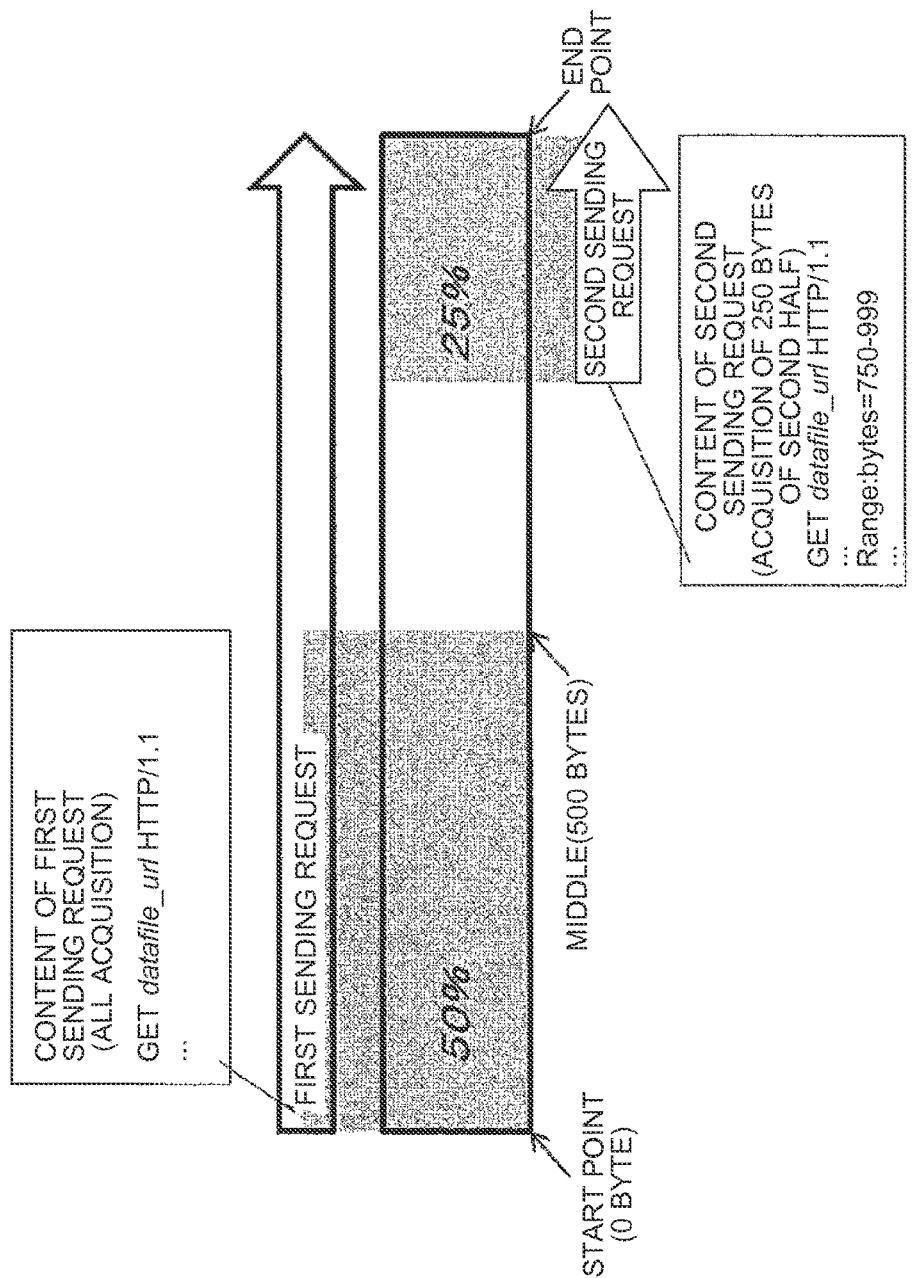
FIG. 26 is a schematic diagram of data range of a data sending request required at a first timing by a communication apparatus 310C of a third modification of the third embodiment.
Figure 27:
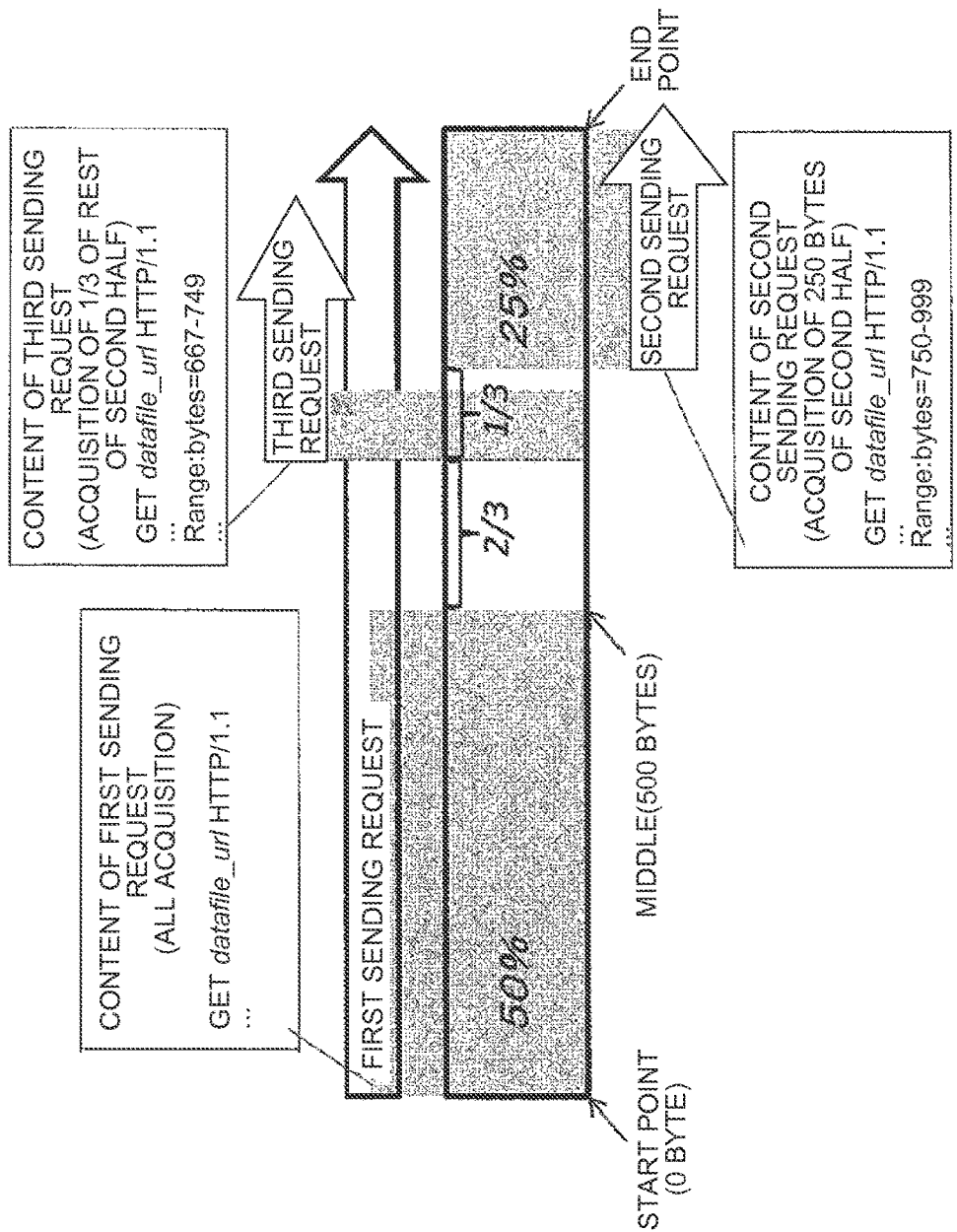
FIG. 27 is a schematic diagram of data range of a data sending request required at a second timing by the communication apparatus 310C.

By referring to FIGS. 26 and 27, concrete examples of operation of the communication apparatus 310C will be explained. FIG. 26 shows a data range of a data sending request to be sent at the first timing. FIG. 27 shows a data range of a data sending request to be sent at the second timing.

First, as shown in FIG. 26, the indication unit 311C indicates a data file and a range thereof (requested by the first data sending request and the second data sending request). By HTTP GET request, in a data file specified as datafile_url in FIG. 26, the first range and the second range are indicated by Range. Specifically, datafile_url is indicated as the data file, all of data file is indicated as the first range, and 750-999 bytes are indicated as the second range. Here, as the first range, all of data file is indicated. Accordingly, the data range is not indicated by Range. Then, the request sending unit 312C sends the first data sending request and the second data sending request (HTTP GET request) of the first range of the second range (indicated by the indication unit 311C) in the first data file.

Next, the data receiving unit 313C receives the first data and the second data in order. Furthermore, the data receiving unit 313C measures a receiving speed or a receiving amount of the first data, and a receiving speed or a receiving amount of the second data, respectively.

Next, as shown in FIG. 27, the indication unit 311C indicates a data file and a range thereof (requested by the third data sending request). By HTTP GET request, in a data file specified as datafile_url in FIG. 27, the third range is indicated by Range. Specifically, datafile_url is indicated as the data file. The indication unit 311C determines the third range based on the receiving speed of the first data and the second data, or the receiving amount of the first data and the second data. For example, as shown in FIG. 27, at timing when the first data is received from 0 byte to 499 bytes, the case that the second data is received from 750 bytes to 999 bytes is thought about. In this case, as the third range, data from 667 bytes to 749 bytes is indicated.

In example of FIG. 27, ratio of the data receiving speed by the first data sending request to the data receiving speed by the second data sending request is "2:1". Accordingly, as the third range, ⅓ of the second half of non-acquired part (500 bytes~749 bytes) is indicated. If the data receiving speed by the third data sending request is equal to the data receiving speed by the second data sending request, at timing when receiving of data by the third data sending request is completed, the receiving data amount by the first data sending request is 667 bytes. As a result, data of all data file can be effectively acquired. Here, for example, if HTTP connection to be used by the third data sending request is same as HTTP connection used by the second data sending request, the data receiving speed by the third data sending request can be equal to the data receiving speed by the second data sending request.

The request sending unit 312C sends the third data sending request (HTTP GET request) of the third range (indicated by the indication unit 311C) in the data file.

In the communication 310C, the data receiving unit 313C further receives the third data.

The write control unit 314C reconstructs the first data file by connecting the first data~the third data.

Here, if a speed to receive the first data or the second data is slower by starting to receive the third data, the write control unit 314C may make the data receiving unit 313C stop receiving the third data.

According to the communication apparatus 310C of the modification 3 of the third embodiment, after sending the first data sending request and the second data sending request for one data file, while the first data and the second data are being received, the third data sending request is additionally sent. Especially, a data range indicated by the third data sending request is determined based on the first data receiving speed and the second data receiving speed. Accordingly, data in the data file can be effectively acquired. Furthermore, in the modification 3 of the third embodiment, the same connection can be commonly used by the second data sending request and the third data sending request. Accordingly, without overhead to establish new connection, data of the data file can be effectively acquired.

Modification 4 of the Third Embodiment

Next, a modification 4 of the third embodiment will be explained. A system component of the modification 4 of the third embodiment is same as that of FIG. 18.

In a communication apparatus 310D of the modification 4 of the third embodiment, a plurality of data sending requests of respective data ranges in the first data file is sent at the same time. After that, a data sending request for another data range in the first data file is additionally sent. In the modification 3 of the third embodiment, a method for determining another data range is different from the modification 3 of the third embodiment (Refer to FIGS. 28 and 29).

In the communication apparatus 310D of the modification 4 of the third embodiment, respective functions of an indication unit 311D, a request sending unit 312D, and a data receiving unit 313D, are different from those of the communication apparatus 310C of the modification 3 of the third embodiment.

The indication unit 311D indicates a first range~a second range as respective different ranges in the first data file stored in the server 320. For example, as the first range, the indication unit 311D indicates a range from a first position (start position of the first data file) to a second position. As the second range, the indication unit 311D indicates a range from a fourth position (¾ position between the first position and a third position (end position of the first data file)) to the third position. As the third range, the indication unit 311D indicates a range from a fifth position (½ position between the first position and the third position (end position of the first data file)) to the fourth position.

At a first timing, the request sending unit 312D sends a first data sending request of the first range in the first data file to the server 320D, and sends a second data sending request of the second range in the first data file to the server 320D. At a second timing different from the first timing, the request sending unit 312D sends a third data sending request of the third range in the first data file to the server 320D (Refer to FIG. 29). The second timing is timing between after the data receiving unit 313D starts to receive the first data and the second data and before the data receiving unit 313D completes receiving the first data or the second data.

The data receiving unit 313D receives the first data, the second data, and the third data from the server 320D.

The write control unit 314D reconstructs the first data file by connecting the first data, the second data, and the third data.

Figure 28:
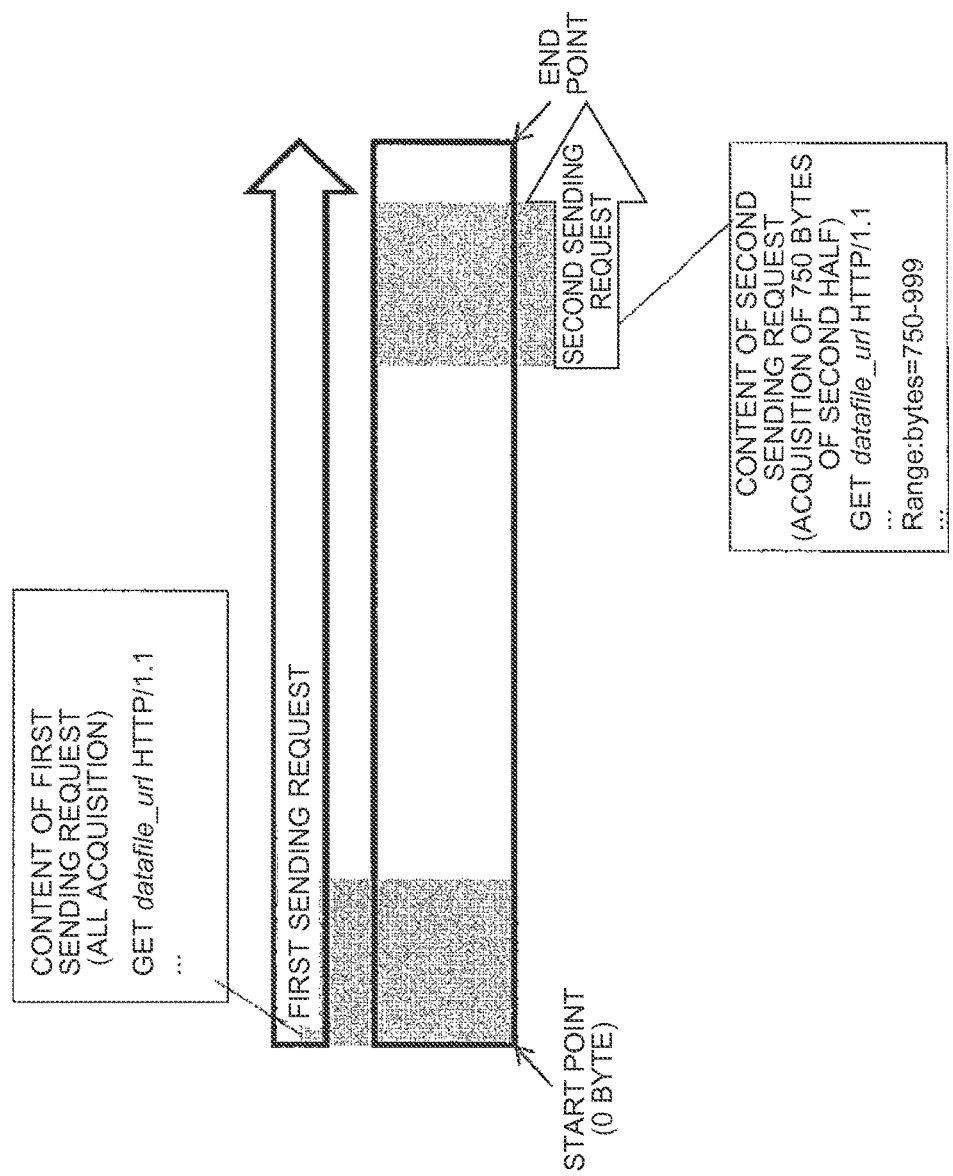
FIG. 28 is a schematic diagram of data range of a data sending request required at a first timing by a communication apparatus 310D of a fourth modification of the third embodiment.
Figure 29:
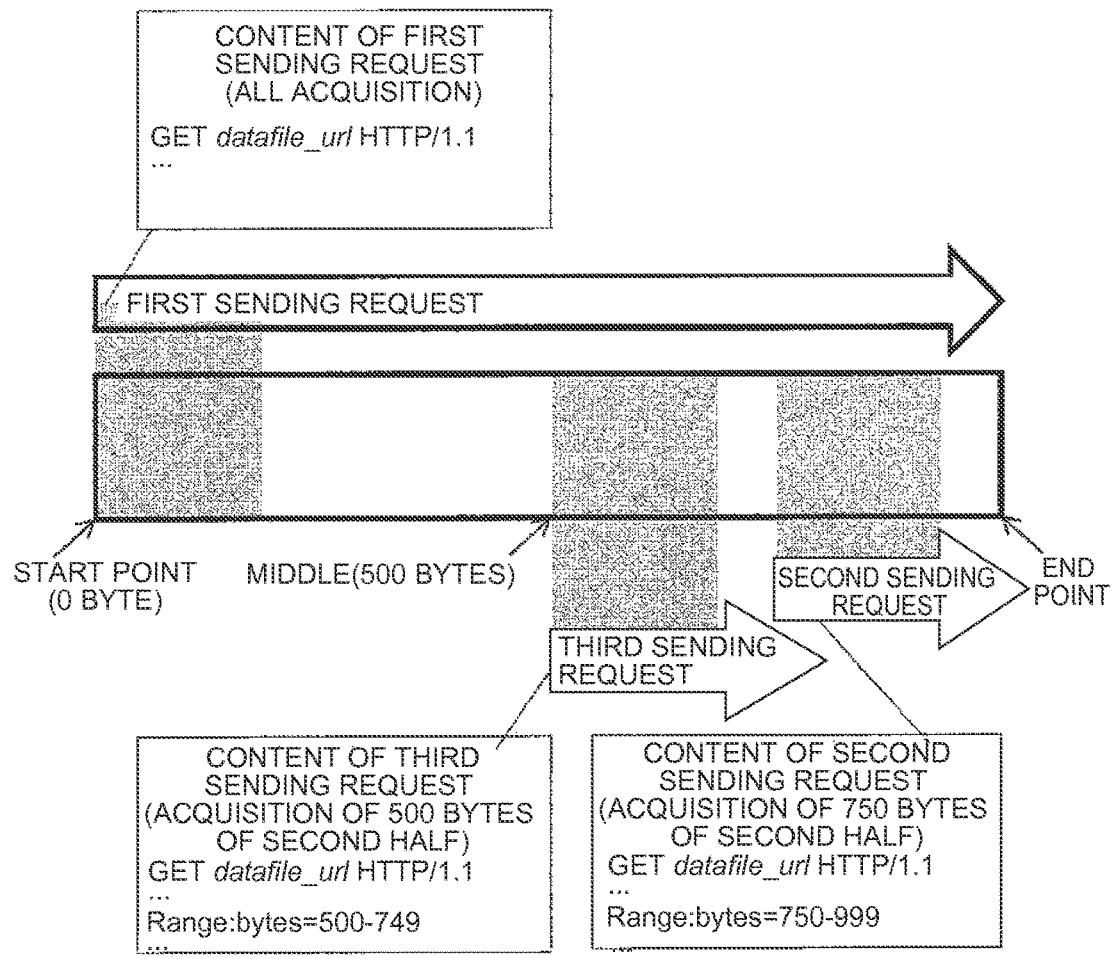
FIG. 29 is a schematic diagram of data range of a data sending request required at a second timing by the communication apparatus 310D.

By referring to FIGS. 28 and 29, concrete examples of operation of the communication apparatus 310D will be explained. FIG. 28 shows a data range of a data sending request to be sent at the first timing. FIG. 29 shows a data range of a data sending request to be sent at the second timing.

First, as shown in FIG. 28, the indication unit 311D indicates a data file and a range thereof (requested by the first data sending request and the second data sending request). By HTTP GET request, in a data file specified as datafile_url in FIG. 28, the first range and the second range are indicated by Range. Specifically, datafile_url is indicated as the data file, all of data file is indicated as the first range, and 750-999 bytes are indicated as the second range. Here, the first range is not indicated by Range. Then, the request sending unit 312D sends the first data sending request and the second data sending request (HTTP GET request) of the first range of the second range (indicated by the indication unit 311D) in the first data file.

Next, the data receiving unit 313D receives the first data and the second data in order.

Next, as shown in FIG. 29, the indication unit 311D indicates a data file and a range thereof (requested by the third data sending request). By HTTP GET request, in a data file specified as datafile_url in FIG. 29, the third range is indicated by Range. Specifically, datafile_url is indicated as the data file. As the third range, the indication unit 311D determines data from 500 bytes to 749 bytes.

The request sending unit 312D sends the third data sending request (HTTP GET request) of the third range (indicated by the indication unit 311D) in the data file.

In the communication 310D, the data receiving unit 313D receives the first data~the third data.

The write control unit 314D reconstructs the first data file by connecting the first data~the third data.

Here, if a speed to receive the first data or the second data is slower by starting to receive the third data, the write control unit 314D may make the data receiving unit 313D stop receiving the third data.

In the modification 4 of the third embodiment, the first data sending request is a request to send all of data file. The second data sending request is a request to send data from 750 bytes to an end position of the data file. The third data sending request is a request to send data from 500 bytes to 749 bytes. While all data by the third data sending request and the second data sending request are being acquired, if data by the first data sending request is acquired to 499 bytes, acquisition of all of data file is completed.

On the other hand, after starting to receive data by the third data sending request, when receiving data by the third data sending request is stopped, if data by the first data sending request is continuously received to a start position to receive data by the second data sending request, non-received data by the third data sending request can be continuously received without sending unnecessary request.

Here, if receiving data by the third data sending request is stopped, in a data range (500 bytes~749 bytes) to be received by the third data sending request, acquired part and non-acquired part are mixed. When received (acquired) data by the first data sending request is overlapped with the acquired part in the data range to be received by the third data sending request, receiving data by the first data sending request may be interrupted and restarted from the non-acquired part in the data range to be received by the third data sending request.

In this case, the acquired part in the data range to be received by the third data sending request may be continuously received by the first data sending request. By continuously receiving the acquired part in the data range to be received by the third data sending request, overhead to interrupt and reopen HTTP connection of the first data sending request can be reduced.

In the modification 4 of the third embodiment, until a data range received by a data sending request reaches a start point of a data range received by another data sending request, receiving data by the data sending request is continuously executed. However, before a data range received by the data sending request reaches a start point of a data range received by another data sending request, receiving data by the data sending request may be completed on the way. For example, because of circumstances of application or detection of some data boundary, receiving data by the data sending request may be completed. Furthermore, after the receiving data by the data sending request is completed or interrupted once, the receiving data by the data sending request may be restarted.

According to the communication apparatus 310D of the modification 4 of the third embodiment, after sending the first data sending request and the second data sending request for one data file, while the first data and the second data are being received, the third data sending request is additionally sent. Accordingly, data in the data file can be effectively acquired. Furthermore, in the communication apparatus 310D of the modification 4 of the third embodiment, respective data ranges to be received by the second data sending request and the third data sending request are indicated from a start point of an end side (the second half) of the data file. Accordingly, even if receiving data by the second data sending request or the third data sending request is stopped on the way, non-received (acquired) data thereby can be acquired as received data by the first data sending request.

According to at least one of above-mentioned embodiments and modifications thereof, when a plurality of data sending (or receiving) requests of respective data ranges in a data file is executed in parallel, data in the data file can be effectively acquired or sent.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for communicating with a first device including a first data file via a network, the apparatus comprising:
   a memory; and
   one or more processors configured to:
   indicate a first data sending request to send first data from a first position as a start position of the first data file toward a second position as an end position of the first data file, and a second data sending request to send second data from the second position toward the first position in the first data file;
   control sending the first data sending request and the second data sending request to the first device; and
   control receiving the first data as a reply to the first data sending request, and the second data as a reply to the second data sending request, wherein
   the one or more processors are further configured to:
   indicate a third data sending request to send third data from a third position between the first position and the second position toward the second position in the first data file and indicate the third position, based on respective speeds for receiving the first data and the second data, and
   control sending the third data sending request at a first timing after starting to receive the first data and the second data, and before receiving of the first data or the second data is complete.

2. The apparatus according to claim 1, wherein
the one or more processors are configured to:
control stopping of the receiving of the first data and the second data, when the first data from the first position to the third position and the second data from the second position to the third position are received.

3. The apparatus according to claim 1, wherein the one or more processors are configured to:
   indicate a fourth data sending request to send fourth data from the third position toward the first position in the first data file, and
   control sending the fourth data sending request at a second timing after starting to receive the first data and the second data, and before receiving of the first data or the second data is complete.

4. The apparatus according to claim 3, wherein the one or more processors are configured to:
   control receiving the third data and the fourth data, and
   control stopping the receiving of the first data and the fourth data when the first data from the first position to the fourth position and the fourth data from the third position to the fourth position are received, and stopping the receiving of the second data and the third data when the second data from the second position to a fifth position and the third data from the third position to the fifth position are received.

5. The apparatus according to claim 1, wherein the one or more processors are configured to:
   control stopping the receiving of the third data, when a speed of receiving the first data or the second data after starting to receive the third data is slower than a speed of receiving the first data or the second data before starting to receive the third data.

6. The apparatus according to claim 3, wherein
the third position is a middle position between the first position and the second position.

7. A non-transitory computer readable medium for storing instructions that, when executed by a computer, cause the computer to perform operations for communicating with a first device including a first data file via a network,
the operations comprising:
   indicating a first data sending request to send first data from a first position as a start position of the first data file toward a second position as an end position of the first data file;
   indicating a second data sending request to send second data from the second position toward the first position in the first data file;
   sending the first data sending request and the second data sending request to the first device; and
   receiving the first data as a reply to the first data sending request, and the second data as a reply to the second data sending request, wherein
   the indicating includes indicating a third data sending request to send third data from a third position between the first position and the second position toward the second position in the first data file and indicating the third position, based on respective speeds for receiving the first data and the second data, and
   the sending includes sending the third data sending request at a first timing after starting to receive the first data and the second data, and before completing receiving of the first data or the second data.

* * * * *